(12) United States Patent
Zhong et al.

(10) Patent No.: US 10,425,357 B2
(45) Date of Patent: Sep. 24, 2019

(54) METHOD FOR TRANSMITTING DATA STREAM IN FLEXIBLE ETHERNET, TRANSMITTER, AND RECEIVER

(71) Applicant: Huawei Technologies Co., Ltd., Shenzhen (CN)

(72) Inventors: Qiwen Zhong, Shenzhen (CN); Qiuyou Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/857,083

(22) Filed: Dec. 28, 2017

(65) Prior Publication Data

US 2018/0123978 A1    May 3, 2018

Related U.S. Application Data

(63) Continuation of application No. PCT/CN2016/087312, filed on Jun. 27, 2016.

(30) Foreign Application Priority Data

Jul. 3, 2015  (CN) .......................... 2015 1 0388028

(51) Int. Cl.
*H04L 12/911* (2013.01)
*H04L 12/24* (2006.01)
*H04L 12/801* (2013.01)

(52) U.S. Cl.
CPC ........ *H04L 47/828* (2013.01); *H04L 41/0893* (2013.01); *H04L 47/34* (2013.01)

(58) Field of Classification Search
CPC .... H04L 41/0893; H04L 47/34; H04L 47/828
See application file for complete search history.

(56) References Cited

U.S. PATENT DOCUMENTS

2004/0156390 A1* 8/2004 Prasad .................. H04J 3/1617
370/466
2010/0098415 A1* 4/2010 Jiang ..................... H04J 3/1658
398/45

(Continued)

FOREIGN PATENT DOCUMENTS

CN         103412830 A    11/2013
CN         103534971 A     1/2014

(Continued)

OTHER PUBLICATIONS

InnovationQ search in NPL (Year: 2019).*

(Continued)

*Primary Examiner* — Benjamin H Elliott, IV
(74) *Attorney, Agent, or Firm* — Conley Rose, P.C.

(57) ABSTRACT

A method for transmitting a data stream in a flexible Ethernet, where the method includes obtaining a to-be-transmitted data stream, allocating the data stream to N physical connections according to a sequence of the N physical connections in a physical connection group in order to obtain N sub-streams respectively corresponding to the N physical connections, and transmitting the N sub-streams using the N physical connections, where a sub-stream transmitted over each physical connection includes configuration status information of each physical connection, and the configuration status information includes an identifier of each physical connection and an identifier of a physical connection adjacent to each physical connection in the physical connection group. The method reduces, in a data stream transmission process, overheads required for identifying a sequence of all the physical connections in the physical connection group and improves transmission efficiency.

17 Claims, 16 Drawing Sheets

(56) References Cited

U.S. PATENT DOCUMENTS

| | | | | |
|---|---|---|---|---|
| 2010/0198980 | A1* | 8/2010 | Astrom | H04L 1/0014 709/231 |
| 2010/0246396 | A1* | 9/2010 | Licardie | H04L 47/10 370/232 |
| 2013/0235734 | A1* | 9/2013 | Ding | H04L 47/34 370/241.1 |
| 2014/0362678 | A1* | 12/2014 | Koh | H04L 49/351 370/216 |
| 2014/0362989 | A1* | 12/2014 | Chiesa | H04L 9/12 380/256 |
| 2015/0055664 | A1* | 2/2015 | Kanonakis | H04L 12/40136 370/535 |
| 2016/0070615 | A1* | 3/2016 | Zhong | G06F 11/10 714/776 |
| 2016/0191277 | A1* | 6/2016 | Li | H04L 1/0026 370/465 |
| 2016/0294990 | A1* | 10/2016 | Cao | H04L 69/323 |
| 2017/0006360 | A1* | 1/2017 | Gareau | G06F 13/40 |
| 2017/0331577 | A1* | 11/2017 | Parkvall | H04J 11/0079 |
| 2017/0331677 | A1* | 11/2017 | Zhou | H04L 29/08 |
| 2018/0034573 | A1* | 2/2018 | Gareau | H04J 3/1611 |
| 2018/0123978 | A1* | 5/2018 | Zhong | H04L 41/0893 |
| 2018/0145928 | A1* | 5/2018 | Zhong | H04L 47/2491 |

FOREIGN PATENT DOCUMENTS

| | | |
|---|---|---|
| CN | 104320345 A | 1/2015 |
| CN | 104426631 A | 3/2015 |
| CN | 104539531 A | 4/2015 |
| EP | 2999152 A1 | 3/2016 |
| WO | 2014183299 A1 | 11/2014 |

OTHER PUBLICATIONS

InnovationQ search in Patents and Patent Publication (Year: 2019).*
OIF, "IA OIF-FLEXE-01.0 Flex Ethernet Implementation Agreement," XP055459137, Mar. 1, 2016, 31 pages.
Foreign Communication From a Counterpart Application, European Application No. 16820759.5, Extended European Search Report dated Jun. 1, 2018, 9 pages.
Foreign Communication From a Counterpart Application, Chinese Application No. 2015103880281, Chinese Search Report dated Jan. 15, 2019, 2 pages.
Foreign Communication From a Counterpart Application, Chinese Application No. 2015103880281, Chinese Office Action dated Jan. 23, 2019, 3 pages.
Machine Translation and Abstract of Chinese Publication No. CN103412830, Nov. 27, 2013, 50 pages.
Machine Translation and Abstract of Chinese Publication No. CN104320345, Jan. 28, 2015, 20 pages.
Foreign Communication From a Counterpart Application, PCT Application No. PCT/CN2016/087312, English Translation of International Search Report dated Sep. 19, 2016, 2 pages.
Foreign Communication From a Counterpart Application, PCT Application No. PCT/CN2016/087312, English Translation of Written Opinion dated Sep. 19, 2016, 7 pages.

* cited by examiner

1810 — Receive N sub-streams using N physical connections in a physical connection group, where a sub-stream transmitted over each physical connection includes configuration status information of each physical connection, the configuration status information includes an identifier of each physical connection and map information in the physical connection group, and the map information includes M bits, where M is a total quantity of physical connections that can be contained in the physical connection group, values of bits that are corresponding to identifiers of the N physical connections and that are in the M bits are 1, and values of the remaining bits are 0, and the configuration status information further includes a request bit and an acknowledgment bit, the request bit is used to request a receive end to update configuration of the physical connection group according to the map information, and the acknowledgment bit is used by the receive end to confirm a configuration update of the physical connection group 1820 — Assemble the N sub-streams according to a sequence of the N physical connections in the physical connection group in order to restore a data stream

FIG. 18

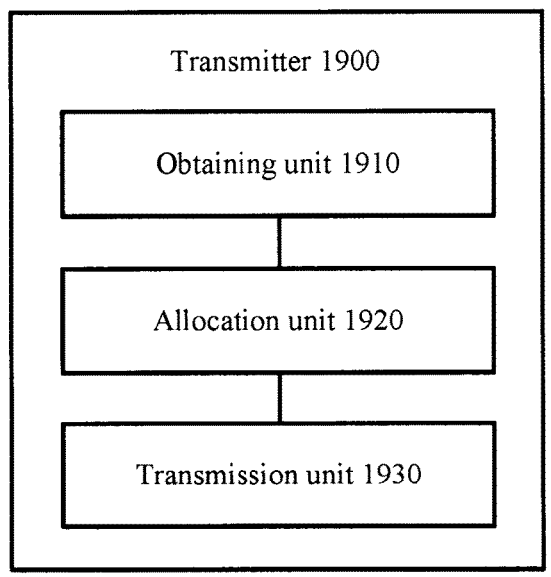

FIG. 19

| SH | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 1 | 0 | 0x4B | | | | | | | | | | | PHY Map | | | | | | | | | | | | This PHY | | | | | | | |
| 0 | 1 | FlexE Group Number | | | | | | | | | | | | | | | | | | | | | | | | | | | | | | |
| 0 | 1 | Reserved | | | | | | | | | | | | | | | | | | | | | | | | | | | | | | |
| 0 | 1 | | | | | | | | | | | | | | | | | | | | | | | | | | | | | | | |

FIG. 23

| SH | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 1 | 0 | 0x4B | | | | | | | | | | | Group ID Label | | | | | This PHY ID Label | | | | | | Next PHY ID Label | | | | | | | |
| 0 | 1 | | | | | | | | | | | | | | | | | | | | | | | | | | | | | | | |
| 0 | 1 | | | | | | | | | | | | | | | | | | | | | | | | | | | | | | | |
| 0 | 1 | | | | | | | | | | | | | | | | | | | | | | | | | | | | | | | |

FIG. 24

| SH | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 1 | 0 | 0x4B | | | | | | | | | | | Group ID Label | | | | | This PHY ID Label | | | | | | Next PHY ID Label | | | | | | | |
| 0 | 1 | ack | | | | | | | | | | | | | | | | | | | | | | | | | | | | | | |
| 0 | 1 | | | | | | | | | | | | | | | | | | | | | | | | | | | | | | | |
| 0 | 1 | | | | | | | | | | | | | | | | | | | | | | | | | | | | | | | |

FIG. 25

| SH | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 1 0 | 0x4B | | | | | | | | Group ID Label | | | | | | | | This PHY ID Label | | | | | | | | Next PHY ID Label | | | | | | | |
| 0 1 | R | A | | | | | | | | | | | | | | | | | | | | | | | | | | | | | | |
| 0 1 | | | | | | | | | | | | | | | | | | | | | | | | | | | | | | | | |
| 0 1 | | | | | | | | | | | | | | | | | | | | | | | | | | | | | | | | |

FIG. 26

| SH | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 1 0 | 0x4B | | | | | | | PHY OH Byte 1 | | | | | | | | PHY OH Byte 2 | | | | | | | | |
| 0 1 | R | A | | | | | | | | | | | | | | | | | | | | | | |
| 0 1 | | | | | | | | | | | | | | | | | | | | | | | | |
| 0 1 | | | | | | | | | | | | | | | | | | | | | | | | |

FIG. 27

| 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|
| PHY OH Byte 3 | | | | | | | | | | | | | | | |
| | | | | | | | | PHY OH Byte 4 | | | | | | | |
| | | | | | | | | | | | | | | | |
| | | | | | | | | | | | | | | | |

FIG. 28

| PHY OH Byte 1 | PHY OH Byte 2 | PHY OH Byte 3 | PHY OH Byte 4 | | R | A |
|---|---|---|---|---|---|---|
| PHY Configuration Map Bit 0 to 31 | | | | | R | A |
| PHY Configuration Map Bit 32 to 63 | | | | | R | A |
| PHY Configuration Map Bit 64 to 95 | | | | | R | A |
| PHY Configuration Map Bit 96 to 127 | | | | | R | A |
| PHY Configuration Map Bit 128 to 159 | | | | | R | A |
| PHY Configuration Map Bit 160 to 191 | | | | | R | A |
| PHY Configuration Map Bit 192 to 223 | | | | | R | A |
| PHY Configuration Map Bit 224 to 255 | | | | | R | A |
| Group ID Label | PHY ID Label | | | | R | A |
| | | | | | R | A |

FIG. 29

METHOD FOR TRANSMITTING DATA STREAM IN FLEXIBLE ETHERNET, TRANSMITTER, AND RECEIVER

CROSS-REFERENCE TO RELATED APPLICATIONS

This application is a continuation of International Patent Application No. PCT/CN2016/087312 filed on Jun. 27, 2016, which claims priority to Chinese Patent Application No. 201510388028.1 filed on Jul. 3, 2015. The disclosures of the aforementioned applications are hereby incorporated by reference in their entireties.

TECHNICAL FIELD

Embodiments of the present disclosure relate to the Ethernet field, and in particular, to a method for transmitting a data stream in a flexible Ethernet, a transmitter, and a receiver.

BACKGROUND

Introduction of a concept of a flexible Ethernet provides a feasible evolution direction for virtualization of an Ethernet physical connection. Further, in the flexible Ethernet, one or more physical connections may be cascaded together in a specific sequence to constitute one physical connection group. The physical connection group is equivalent to a logical connection between a transmit end and a receive end, and interface bandwidth of the logical connection may be considered as a sum of bandwidth of all physical connections in the physical connection group. Therefore, according to an actual requirement, logical connections with different bandwidth may be configured in the flexible Ethernet by cascading different physical connections, and the flexible Ethernet is more flexible than a conventional Ethernet that depends on a physical connection.

In the flexible Ethernet, a transmit end allocates a data stream over a logical connection to each physical connection in a physical connection group for parallel transmission, and the transmit end allocates the data stream exactly according to a sequence of physical connections in the physical connection group, that is, in a specific period, when a physical connection is ranked first, a sub-stream allocated to the physical connection is also ranked first in an entire data stream. After receiving a sub-stream transmitted over each physical connection in the physical connection group, a receive end needs to assemble all sub-streams in the same sequence as the transmit end in order to restore the data stream over the logical connection. Therefore, in a process of parallel transmission of sub-streams, each physical connection in the group not only indicates an identifier to the receive end, but also identifies a sequence of all physical connections in the physical connection group for the receive end such that the receive end restores the data stream.

In order to identify a sequence of all physical connections in a physical connection group, multiple configuration interaction maps of the physical connection group are transmitted in an overhead area (a bit area included in an overhead code block) of each sub-stream. In this manner, much redundant information is transmitted, and resources in the overhead area are wasted. In addition, transmission of the multiple configuration interaction maps of the physical connection group takes a long time, thereby resulting in low transmission efficiency.

SUMMARY

Embodiments of the present disclosure provide a method for transmitting a data stream in a flexible Ethernet, a transmitter, and a receiver in order to reduce, in a data stream transmission process, overheads required for identifying a sequence of physical connections in a physical connection group and improve transmission efficiency.

According to a first aspect, a method for transmitting a data stream in a flexible Ethernet is provided, including obtaining a to-be-transmitted data stream, where the data stream is to be transmitted using a physical connection group between a transmit end and a receive end, and the physical connection group includes N physical connections, allocating the data stream to the N physical connections according to a sequence of the N physical connections in the physical connection group in order to obtain N sub-streams respectively corresponding to the N physical connections, and transmitting the N sub-streams using the N physical connections, where a sub-stream transmitted over each physical connection includes configuration status information of each physical connection, the configuration status information includes an identifier of each physical connection and an identifier of a physical connection that is adjacent to each physical connection and that is in the physical connection group, and configuration status information of the N physical connections jointly indicates the sequence of the N physical connections.

With reference to the first aspect, in an implementation of the first aspect, the configuration status information of each physical connection is included in an overhead code block of the sub-stream transmitted over each physical connection.

With reference to any one of the first aspect, or the foregoing implementation of the first aspect, in another implementation of the first aspect, the physical connection that is adjacent to each physical connection and that is in the physical connection group includes a previous physical connection of each physical connection in the physical connection group, and/or a next physical connection of each physical connection in the physical connection group.

With reference to any one of the first aspect, or the foregoing implementations of the first aspect, in another implementation of the first aspect, the configuration status information of each physical connection further includes first indication information and/or second indication information, where the first indication information is used to indicate whether a current physical connection is a first physical connection in the physical connection group, and the second indication information is used to indicate whether a current physical connection is a last physical connection in the physical connection group.

With reference to any one of the first aspect, or the foregoing implementations of the first aspect, in another implementation of the first aspect, the sub-stream transmitted over each physical connection further includes third indication information, and the method further includes negotiating, using the third indication information, with the receive end to update the physical connection group when a quantity of physical connections in the physical connection group and/or the sequence of the physical connections in the physical connection group change or changes.

With reference to any one of the first aspect, or the foregoing implementations of the first aspect, in another implementation of the first aspect, the sub-stream transmitted over each physical connection further includes an identifier of the physical connection group.

With reference to any one of the first aspect, or the foregoing implementations of the first aspect, in another implementation of the first aspect, the configuration status information of each physical connection is periodically transmitted in basic frames.

According to a second aspect, a method for transmitting a data stream in a flexible Ethernet is provided, including receiving N sub-streams using N physical connections in a physical connection group, where a sub-stream transmitted over each physical connection includes configuration status information of each physical connection, the configuration status information includes an identifier of each physical connection and an identifier of a physical connection that is adjacent to each physical connection and that is in the physical connection group, and configuration status information of the N physical connections jointly indicates a sequence of the N physical connections, and assembling the N sub-streams according to the sequence of the N physical connections in order to restore the data stream.

With reference to the second aspect, in an implementation of the second aspect, the method further includes determining, according to identifiers of the N physical connections, the N physical connections included in the physical connection group, and determining the sequence of the N physical connections according to identifiers of adjacent physical connections of the N physical connections.

With reference to any one of the second aspect, or the foregoing implementation of the second aspect, in another implementation of the second aspect, the configuration status information of each physical connection is included in an overhead code block of the sub-stream transmitted over each physical connection.

With reference to any one of the second aspect, or the foregoing implementations of the second aspect, in another implementation of the second aspect, the physical connection that is adjacent to each physical connection and that is in the physical connection group includes a previous physical connection of each physical connection in the physical connection group, and/or a next physical connection of each physical connection in the physical connection group.

With reference to any one of the second aspect, or the foregoing implementations of the second aspect, in another implementation of the second aspect, the configuration status information of each physical connection further includes first indication information and/or second indication information, where the first indication information is used to indicate whether a current physical connection is a first physical connection in the physical connection group, and the second indication information is used to indicate whether a current physical connection is a last physical connection in the physical connection group.

With reference to any one of the second aspect, or the foregoing implementations of the second aspect, in another implementation of the second aspect, the sub-stream transmitted over each physical connection further includes third indication information, and the method further includes negotiating, using a third indication information, with the transmit end to update the physical connection group when a quantity of physical connections in the physical connection group and/or the sequence of the physical connections in the physical connection group change or changes.

With reference to any one of the second aspect, or the foregoing implementations of the second aspect, in another implementation of the second aspect, the sub-stream transmitted over each physical connection further includes an identifier of the physical connection group.

With reference to any one of the second aspect, or the foregoing implementations of the second aspect, in another implementation of the second aspect, the configuration status information of each physical connection is periodically transmitted in basic frames.

According to a third aspect, a transmitter is provided, including an obtaining unit configured to obtain a to-be-transmitted data stream, where the data stream is to be transmitted using a physical connection group between a transmit end and a receive end, and the physical connection group includes N physical connections, an allocation unit configured to allocate the data stream to the N physical connections according to a sequence of the N physical connections in the physical connection group in order to obtain N sub-streams respectively corresponding to the N physical connections, and a transmission unit configured to transmit the N sub-streams using the N physical connections, where a sub-stream transmitted over each physical connection includes configuration status information of each physical connection, the configuration status information includes an identifier of each physical connection and an identifier of a physical connection that is adjacent to each physical connection and that is in the physical connection group, and configuration status information of the N physical connections jointly indicates the sequence of the N physical connections.

With reference to the third aspect, in an implementation of the third aspect, the configuration status information of each physical connection is included in an overhead code block of the sub-stream transmitted over each physical connection.

With reference to any one of the third aspect, or the foregoing implementation of the third aspect, in another implementation of the third aspect, the physical connection that is adjacent to each physical connection and that is in the physical connection group includes a previous physical connection of each physical connection in the physical connection group, and/or a next physical connection of each physical connection in the physical connection group.

With reference to any one of the third aspect, or the foregoing implementations of the third aspect, in another implementation of the third aspect, the configuration status information of each physical connection further includes first indication information and/or second indication information, where the first indication information is used to indicate whether a current physical connection is a first physical connection in the physical connection group, and the second indication information is used to indicate whether a current physical connection is a last physical connection in the physical connection group.

With reference to any one of the third aspect, or the foregoing implementations of the third aspect, in another implementation of the third aspect, the sub-stream transmitted over each physical connection further includes third indication information, and the transmitter further includes a negotiation unit configured to negotiate, using the third indication information, with the receive end to update the physical connection group when a quantity of physical connections in the physical connection group and/or the sequence of the physical connections in the physical connection group change or changes.

With reference to any one of the third aspect, or the foregoing implementations of the third aspect, in another implementation of the third aspect, the sub-stream transmitted over each physical connection further includes an identifier of the physical connection group.

With reference to any one of the third aspect, or the foregoing implementations of the third aspect, in another implementation of the third aspect, the configuration status information of each physical connection is periodically transmitted in basic frames.

According to a fourth aspect, a receiver is provided, including a receiving unit configured to receive N substreams using N physical connections in a physical connection group, where a sub-stream transmitted over each physical connection includes configuration status information of each physical connection, the configuration status information includes an identifier of each physical connection and an identifier of a physical connection that is adjacent to each physical connection and that is in the physical connection group, and configuration status information of the N physical connections jointly indicates a sequence of the N physical connections, and a restoration unit configured to assemble the N sub-streams according to the sequence of the N physical connections in order to restore the data stream.

With reference to the fourth aspect, in an implementation of the fourth aspect, the receiver further includes a first determining unit configured to determine, according to identifiers of the N physical connections, the N physical connections included in the physical connection group, and a second determining unit configured to determine the sequence of the N physical connections according to identifiers of adjacent physical connections of the N physical connections.

With reference to any one of the fourth aspect, or the foregoing implementation of the fourth aspect, in another implementation of the fourth aspect, the configuration status information of each physical connection is included in an overhead code block of the sub-stream transmitted over each physical connection.

With reference to any one of the fourth aspect, or the foregoing implementations of the fourth aspect, in another implementation of the fourth aspect, the physical connection that is adjacent to each physical connection and that is in the physical connection group includes a previous physical connection of each physical connection in the physical connection group, and/or a next physical connection of each physical connection in the physical connection group.

With reference to any one of the fourth aspect, or the foregoing implementations of the fourth aspect, in another implementation of the fourth aspect, the configuration status information of each physical connection further includes first indication information and/or second indication information, where the first indication information is used to indicate whether a current physical connection is a first physical connection in the physical connection group, and the second indication information is used to indicate whether a current physical connection is a last physical connection in the physical connection group.

With reference to any one of the fourth aspect, or the foregoing implementations of the fourth aspect, in another implementation of the fourth aspect, the sub-stream transmitted over each physical connection further includes third indication information, and the receiver further includes a negotiation unit configured to negotiate, using a third indication information, with the transmit end to update the physical connection group when a quantity of physical connections in the physical connection group and/or the sequence of the physical connections in the physical connection group change or changes.

With reference to any one of the fourth aspect, or the foregoing implementations of the fourth aspect, in another implementation of the fourth aspect, the sub-stream transmitted over each physical connection further includes an identifier of the physical connection group.

With reference to any one of the fourth aspect, or the foregoing implementations of the fourth aspect, in another implementation of the fourth aspect, the configuration status information of each physical connection is periodically transmitted in basic frames.

In the embodiments of the present disclosure, identifiers of a physical connection and a physical connection adjacent to the physical connection are carried in a sub-stream of each physical connection. Therefore, a receive end can restore a sequence relationship between all physical connections in a physical connection group using a local adjacency relationship between all the physical connections in the physical connection group. In comparison with a conventional manner in which configuration interaction maps of the physical connection group are transmitted, this reduces, in a data stream transmission process, overheads required for identifying a sequence of all the physical connections in the physical connection group and improves transmission efficiency.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

FIG. 18 is a schematic flowchart of a method for transmitting a data stream in a flexible Ethernet according to another embodiment of the present disclosure;

FIG. 19 is a schematic block diagram of a transmitter according to another embodiment of the present disclosure;

FIG. 23 illustrates a part of an overhead area 210 in the other approaches.

FIG. 24 illustrates a part of an overhead area 210 in an embodiment of the present disclosure.

FIG. 25 illustrates a part of an overhead area 210 in an embodiment of the present disclosure.

FIG. 26 illustrates a part of an overhead area 210 in an embodiment of the present disclosure.

FIG. 27 illustrates a part (bits 0 to 31) of an overhead area 210.

FIG. 28 illustrates a part (bits 32 to 39) of an overhead area 210.

FIG. 29 illustrates transmission of configuration status information of a physical connection.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

For ease of understanding, the other approaches are briefly described first.

Figure 1:
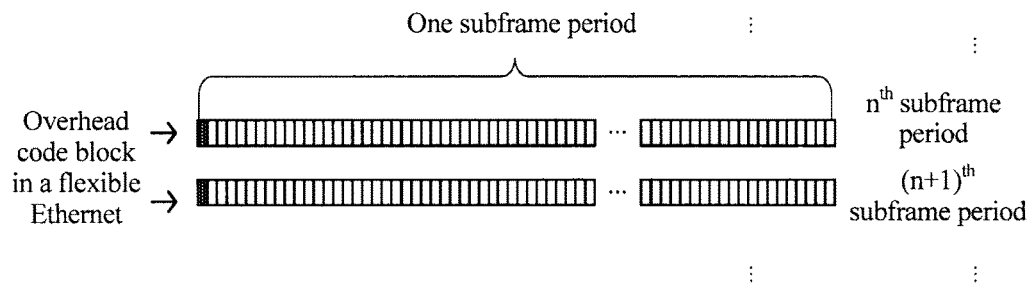
FIG. 1 is a schematic diagram of a structure of a data frame in a flexible Ethernet.

FIG. 1 shows a structure of a data frame in a flexible Ethernet. In FIG. 1, in one subframe period, an overhead code block in the flexible Ethernet is followed by multiple information code blocks with a 64/66b structure, for example, 20480 information code blocks (i.e., 1024×20 information code blocks) with the 64/66b structure. Multiple consecutive subframe periods (usually four subframes) constitute one basic frame. Multiple consecutive basic frames (usually 40 basic frames) constitute one super frame.

Figure 2:
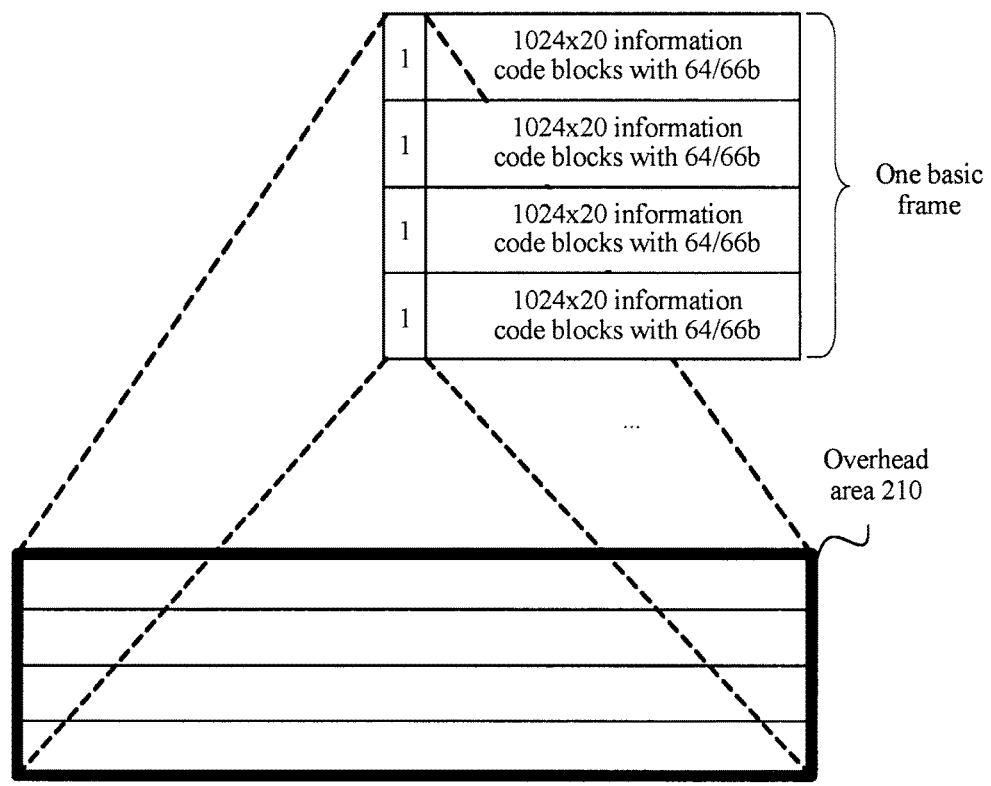
FIG. 2 is a schematic diagram of an overhead area in a data frame.

In the other approaches, a sequence of members in a physical connection group is identified exactly in an overhead area including overhead code blocks. Further, in a process in which a transmit end transmits a data stream to a receive end using the physical connection group, the transmit end allocates the data stream to each physical connection according to a sequence of all physical connections in the physical connection group. When a physical connection is ranked first in the physical connection group, a sub-stream transmitted over the physical connection is also ranked first in an entire data stream. After the data stream is allocated, an allocated sub-stream is transmitted over each physical connection. In the flexible Ethernet, each sub-stream transmitted over a physical interface is transmitted in a form of a data frame, and the data frame transmitted over each physical connection has a periodic structure shown in FIG. 2. One basic frame usually includes four subframes, a header of each subframe is provided with one overhead code block, and there are four overhead code blocks in total. One information code block in the flexible Ethernet usually includes 66 bits, and 4×66 bits of the four overhead code blocks jointly constitute an overhead area 210 shown in FIG. 2. In the other approaches, configuration of the physical connection group is indicated exactly in the overhead area. FIG. 23 shows a part (bits 0 to 31) of the overhead area 210 in the other approaches.

This PHY is an identifier of a current physical connection, and FlexE Group Number is an identifier of a physical connection group to which This PHY belongs. In the other approaches, a sequence between all physical connections in the physical connection group is identified exactly using PHY Map, and details are described in the following.

As shown in FIG. 23, This PHY occupies 8 bits, and it means that one physical connection group may include a maximum of 256 physical connections. In the other approaches, a PHY Map field indicates, using a map, (each physical connection is indicated using one bit in the map), specific members that are in the 256 members and that belong to the physical connection group and specific members that are in the 256 members and that do not belong to the physical connection group. Because PHY Map occupies only 13 bits in one basic frame period, at least 20 basic frame periods are required to form a complete map to indicate whether the 256 physical connections belong to the physical connection group. However, the other approaches are not limited thereto. In the other approaches, a configuration update (that is, a change of a quantity of physical connections in the physical connection group and/or a change of a sequence of physical connections in the physical connection group) process of the physical connection group is further indicated in the PHY Map field. For details, refer to Table 1.

TABLE 1

An information format of PHY Map

| PHY Map | FlexE Group Number | This PHY |
| --- | --- | --- |
| PHY Map Request 0-12 | FlexE Group Number | This PHY |
| PHY Map Request 13-25 | FlexE Group Number | This PHY |
| . . . | | |
| PHY Map Request Reserved 248-255 | FlexE Group Number | This PHY |
| PHY Map Active 0-12 | FlexE Group Number | This PHY |
| PHY Map Active 13-25 | FlexE Group Number | This PHY |
| . . . | | |
| PHY Map Active Reserved 248-255 | FlexE Group Number | This PHY |

It can be learned from Table 1 that two maps are carried in a PHY Map field with 40 periods. One of the two maps includes a PHY Map Request field with 20 basic frame periods, and is used to request to update configuration of a physical connection group, the other map includes a PHY Map Active field with 20 basic frame periods, and is used to request to activate new configuration of the physical connection group. 40 basic frame periods are required in total to transmit the two maps. It should be noted that the receive end can only learn, using the maps transmitted in the PHY Map field, specific members that are in the 256 members and that belong to the physical connection group and specific members that are in the 256 members and that do not belong to the physical connection group. In the other approaches, to implement an indication of a sequence between all physical connections in the physical connection group, it is further stipulated that a physical connection with a greater This PHY identifier in the 256 members is at a more backward location in the physical connection group. In the other approaches, the foregoing stipulation helps implement the identifier of the sequence between all the physical connections in the physical connection group by transmitting multiple maps.

Figure 3:
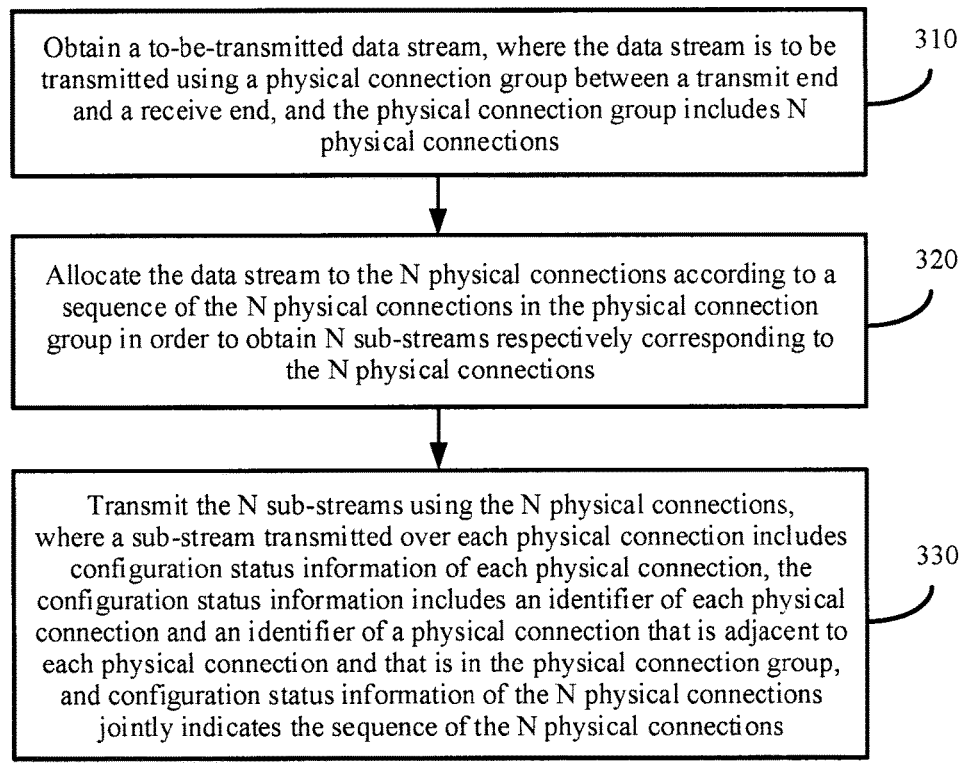
FIG. 3 is a schematic flowchart of a method for transmitting a data stream in a flexible Ethernet according to an embodiment of the present disclosure.

The following describes in detail a method for transmitting a data stream in a flexible Ethernet in an embodiment of the present disclosure with reference to FIG. 3.

FIG. 3 is a schematic flowchart of the method for transmitting a data stream in a flexible Ethernet according to this embodiment of the present disclosure. The method in FIG. 3 may be performed by a transmit end, and the method includes the following steps.

Step 310: Obtain a to-be-transmitted data stream, where the data stream is to be transmitted using a physical connection group between a transmit end and a receive end, and the physical connection group includes N physical connections.

It should be understood that, in the flexible Ethernet, the data stream transmitted using the physical connection group may be considered as a data stream transmitted using a logical connection between the transmit end and the receive end, and interface bandwidth of the logical connection may be a sum of interface bandwidth of all physical connections in the physical connection group. In addition, in the flexible Ethernet, configuration of the physical connection group used to transmit the data stream may be flexibly adjusted according to an actual requirement, that is, a quantity of physical connections in the physical connection group and a sequence of all physical connections in the physical connection group are flexibly adjusted.

In addition, transmitting the data stream using the physical connection group may be understood as transmitting the data stream using multiple Ethernet physical interfaces.

Step 320: Allocate the data stream to the N physical connections according to a sequence of the N physical connections in the physical connection group in order to obtain N sub-streams respectively corresponding to the N physical connections.

It should be understood that the N sub-streams (or referred to as sub-data streams) allocated to the N physical connections may have a specific structure of the data frame shown in FIG. 1.

It should be understood that there is a one-to-one mapping relationship between the N physical connections and the N sub-streams, that is, one physical connection is used to transmit one of the N sub-streams. It should be further understood that step 320 may further include dividing the data stream into the N sub-streams, and determining, according to the sequence of the N physical connections in the physical connection group, respective sub-streams transmitted over the N physical connections, where when a physical connection is ranked first in the physical connection group, a sub-stream transmitted over the physical connection is also ranked first in the data stream.

Step 330: Transmit the N sub-streams using the N physical connections, where a sub-stream transmitted over each physical connection includes configuration status information of each physical connection, the configuration status information includes an identifier of each physical connection and an identifier of a physical connection that is adjacent to each physical connection and that is in the physical connection group, and configuration status information of the N physical connections jointly indicates the sequence of the N physical connections.

Only an identifier of a physical connection and an identifier of a physical connection that is adjacent to the physical connection and that is in the physical connection group are transmitted over one physical connection. Although the receive end obtains only a local adjacency relationship related to the physical connection after receiving configuration status information of the physical connection, the receive end may restore a sequence between all physical connections in the physical connection group after collecting configuration status information of all physical connections in the group.

It should be understood that transmitting the N sub-streams using the N physical connections may be transmitting the N sub-streams in parallel over the N physical connections.

It should be further understood that when the physical connection is the first physical connection in the physical connection group, a previous physical connection adjacent to the physical connection may be null, or may be the last physical connection in the physical connection group, likewise, when the physical connection is the last physical connection in the physical connection group, a next physical connection adjacent to the physical connection may be null, or may be the first physical connection in the physical connection group.

In this embodiment of the present disclosure, identifiers of a physical connection and a physical connection adjacent to the physical connection are carried in a sub-stream of each physical connection. Therefore, a receive end can restore a sequence relationship between all physical connections in a physical connection group using a local adjacency relationship between all the physical connections in the physical connection group. In comparison with a conventional manner in which multiple maps are transmitted, this reduces overheads required for identifying a sequence of all the physical connections in the physical connection group and improves transmission efficiency.

Optionally, in an embodiment, the sub-stream transmitted over each physical connection in the physical connection group further includes an identifier of the physical connection group.

For example, multiple physical connection groups may be set between the transmit end and the receive end, and both the identifier of the physical connection group and the identifier of the physical connection may be transmitted over each physical connection such that the receive end can identify a specific physical connection that is in a specific physical connection group and that is used to transmit the data stream.

Optionally, in an embodiment, the configuration status information of each physical connection is included in an overhead code block of the sub-stream transmitted over each physical connection.

Further, the configuration status information of each physical connection may be set in an overhead code block in one basic frame period, for example, one basic frame period may include four overhead code blocks, and the foregoing configuration status information may be set in the first overhead code block, or may be set at any location of an overhead area including the four overhead code blocks. No specific limitation is imposed in this embodiment of the present disclosure.

Optionally, in an embodiment, the configuration status information of each physical connection is periodically transmitted in basic frames.

In this embodiment of the present disclosure, configuration status information of each physical connection is periodically transmitted, in basic frames, over each physical connection in a physical connection group such that all members in the physical connection group send their respective configuration status information to a receive end in one basic frame period, and the receive end can restore a data stream using configuration status information of each member. However, in the other approaches, 40 basic frame periods are required for completing the foregoing process. Therefore, transmission efficiency of configuration of the physical connection group is improved in this embodiment of the present disclosure as compared with the other approaches. In addition, in the other approaches, to ensure consistency of the configuration of the physical connection group between a transmit end and a receive end, the configuration of the physical connection group is usually required to remain unchanged in one super frame period. If configuration information of the physical connection group is transmitted in a manner in the other approaches, the super frame period needs to be set to at least 40 basic frame periods. However, in a manner in this embodiment of the present disclosure, because transmission of the configuration information of the physical connection group may be completed in one basic frame period, the super frame period may be set to one basic frame period. A shorter super frame period means that system configuration is allowed to change in a shorter time, and this improves flexibility of the system configuration.

Optionally, in an embodiment, the physical connection that is adjacent to each physical connection and that is in the physical connection group may include a previous physical connection of each physical connection in the physical connection group, and/or a next physical connection of each physical connection in the physical connection group.

Following gives description with reference to FIG. 24 and using an example in which the physical connection that is adjacent to each physical connection and that is in the physical connection group is the next physical connection of each physical connection in the physical connection group.

In FIG. 24, bits 8 to 15 of the first overhead code block in a basic frame indicate an identifier of a physical connection group (i.e., Group ID Label), bits 16 to 23 indicate an identifier of a current physical connection (i.e., This PHY ID Label), and bits 24 to 31 indicate an identifier of a next physical connection of the current physical connection (i.e., next PHY ID Label). It should be noted that a quantity of bits occupied by the foregoing identifiers and locations of the identifiers in the overhead area are merely examples for description. In actual application, factors such as a size of the overhead area, sizes of the identifiers, and other indication information that needs to be carried in the overhead area may be comprehensively considered in order to allocate an appropriate quantity of bits and appropriate bit locations for the foregoing identifiers.

Figure 4:
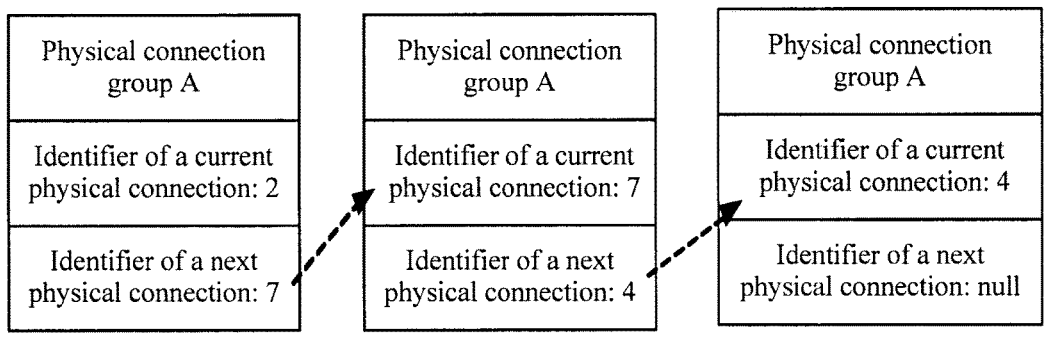
FIG. 4 is an example diagram of an indication manner of a sequence of all physical connections in a physical connection group according to an embodiment of the present disclosure.

Further, it is assumed that the identifier of the foregoing physical connection group is A, the physical connection group A includes three physical connections, identifiers of the three physical connections are respectively 2, 7 and 4, and a sequence of the physical connections in the physical connection group A includes a physical connection 2, a physical connection 7, and a physical connection 4. Configuration status information may be transmitted over the three physical connections in a manner shown in FIG. 24. That is, the physical connection 2 is used to transmit, in the overhead area, information to indicate that the identifier of the physical connection group is A, the identifier of the current physical connection is 2, and the identifier of the next physical connection is 7, the physical connection 7 is used to transmit, in the overhead area, information to indicate that the identifier of the physical connection group is A, the identifier of the current physical connection is 7, and the identifier of the next physical connection is 4, and the physical connection 4 is used to transmit, in the overhead area, information to indicate that the identifier of the physical connection group is A, the identifier of the current physical connection is 4, and the identifier of the next physical connection is null, which indicates that the current physical connection 4 is the last physical connection in the physical connection group A. After receiving the three types of configuration status information, the receive end obtains the sequence between the physical connections by means of combination in a linking manner shown by arrows in FIG. 4, that is, the physical connection 2→the physical connection 7→the physical connection 4, and this means that the sequence of all physical connections in the physical connection group is identified in a one-way linked list manner.

It should be noted that there may be multiple manners of indicating that the identifier of the physical connection is null. That a length of This PHY is 8 bits is used as an example. 0x00 and/or 0xFF may be defined as null. Certainly, another specific definition may also be used.

Optionally, in an embodiment, the physical connection that is adjacent to each physical connection and that is in the physical connection group may include a previous physical connection of each physical connection in the physical connection group. In this embodiment of the present disclosure, an overhead area corresponding to each physical connection may be similar to the overhead area shown in FIG. 24, and only the identifier of the next physical connection in FIG. 24 needs to be replaced with an identifier of the previous physical connection.

Figure 5:
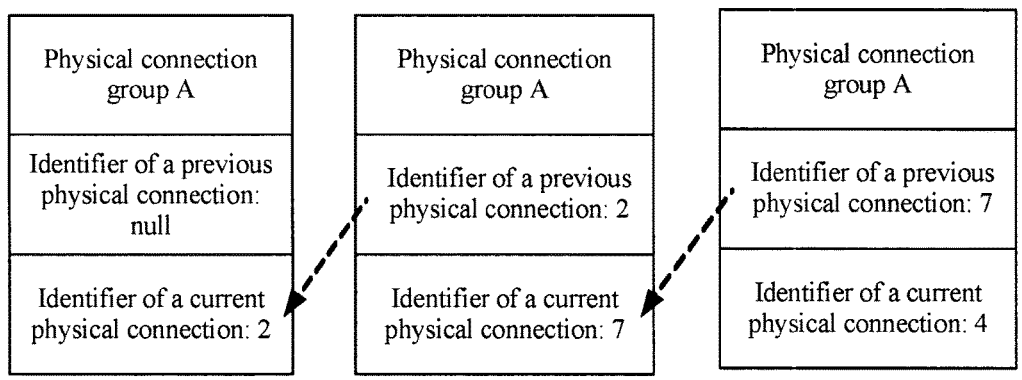
FIG. 5 is an example diagram of an indication manner of a sequence of all physical connections in a physical connection group according to an embodiment of the present disclosure.

Further, it is assumed that the identifier of the physical connection group is A, the physical connection group A includes three physical connections, identifiers of the three physical connections are respectively 2, 7 and 4, and a sequence of the physical connections in the physical connection group A includes a physical connection 2, a physical connection 7, and a physical connection 4. Configuration status information may be transmitted over the three physical connections in a manner described in this embodiment. That is, the physical connection 2 is used to transmit, in the overhead area, information to indicate that the identifier of the physical connection group is A, the identifier of the current physical connection is 2, and the identifier of the previous physical connection is null, which indicates that the current physical connection 2 is the first physical connection in the physical connection group A, the physical connection 7 is used to transmit, in the overhead area, information to indicate that the identifier of the physical connection group is A, the identifier of the current physical connection is 7, and the identifier of the previous physical connection is 2, and the physical connection 4 is used to transmit, in the overhead area, information to indicate that the identifier of the physical connection group is A, the identifier of the current physical connection is 4, and the identifier of the previous physical connection is 7. After receiving the three types of configuration status information, the receive end obtains the sequence relationship between the physical connections by means of combination in a linking manner shown by arrows in FIG. 5, that is, the physical connection 2→the physical connection 7→the physical connection 4, and this means that the sequence of all physical connections in the physical connection group is identified in a one-way linked list manner.

Optionally, in an embodiment, the physical connection that is adjacent to each physical connection and that is in the physical connection group may include a previous physical connection of each physical connection in the physical connection group, and a next physical connection of each physical connection in the physical connection group.

Figure 6:
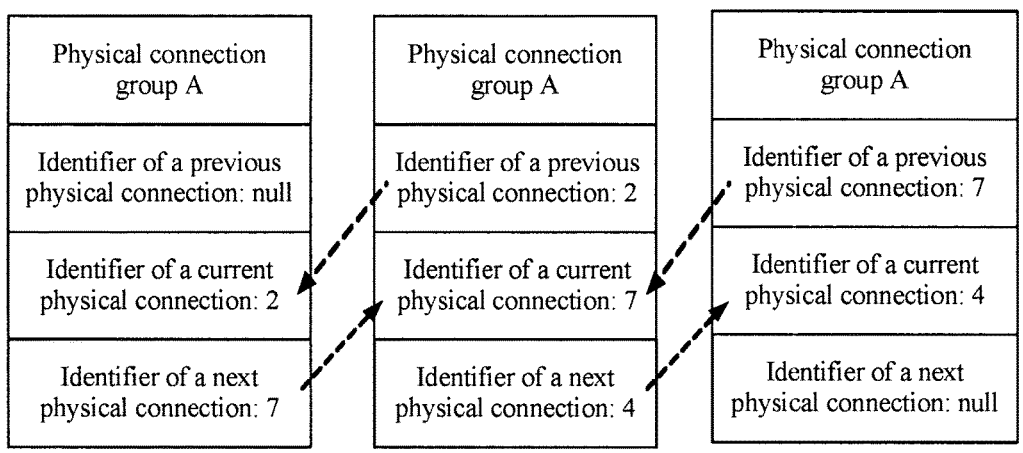
FIG. 6 is an example diagram of an indication manner of a sequence of all physical connections in a physical connection group according to an embodiment of the present disclosure.

In this embodiment of the present disclosure, an overhead area corresponding to each physical connection may be similar to that in FIG. 24, and only one field needs to be redefined in an unused field in the overhead area shown in FIG. 24 to carry an identifier of the previous physical connection of the current physical connection. Further, it is assumed that the identifier of the physical connection group is A, the physical connection group A includes three physical connections, identifiers of the three physical connections are respectively 2, 7 and 4, and a sequence of the physical connections in the physical connection group A includes a physical connection 2, a physical connection 7, and a physical connection 4. Configuration status information may be transmitted over the three physical connections in a manner described in this embodiment. That is, the physical connection 2 is used to transmit, in the overhead area, information to indicate that the identifier of the physical connection group is A, the identifier of the previous physical connection is null, which indicates that the current physical connection is the first physical connection in the physical connection group A, the identifier of the current physical connection is 2, and the identifier of the next physical connection is 7, the physical connection 7 is used to transmit, in the overhead area, information to indicate that the identifier of the physical connection group is A, the identifier of the previous physical connection is 2, the identifier of the current physical connection is 7, and the identifier of the next physical connection is 4, and the physical connection 4 is used to transmit, in the overhead area, information to indicate that the identifier of the physical connection group is A, the identifier of the previous physical connection is 7, the identifier of the current physical connection is 4, and the identifier of the next physical connection is null, which indicates that the current physical connection is the last physical connection in the physical connection group A. After receiving the three types of configuration status information, the receive end obtains the sequence relationship between the physical connections by means of combination in a linking manner shown by arrows in FIG. 6, that is, the physical connection 2→the physical connection 7→the physical connection 4, and this means that the sequence between all physical connections in the physical connection group is identified in a two-way linked list manner.

Optionally, in an embodiment, the configuration status information of each physical connection further includes first indication information and/or second indication information, where the first indication information is used to indicate whether each physical connection is the first physical connection in the physical connection group, and the second indication information is used to indicate whether each physical connection is the last physical connection in the physical connection group.

In this embodiment of the present disclosure, an overhead area corresponding to each physical connection is similar to that in FIG. 24, and only three fields need to be redefined in the overhead area shown in FIG. 24 to respectively carry an identifier of a previous physical connection of the current physical connection, the first indication information, and the second indication information.

Figure 7:
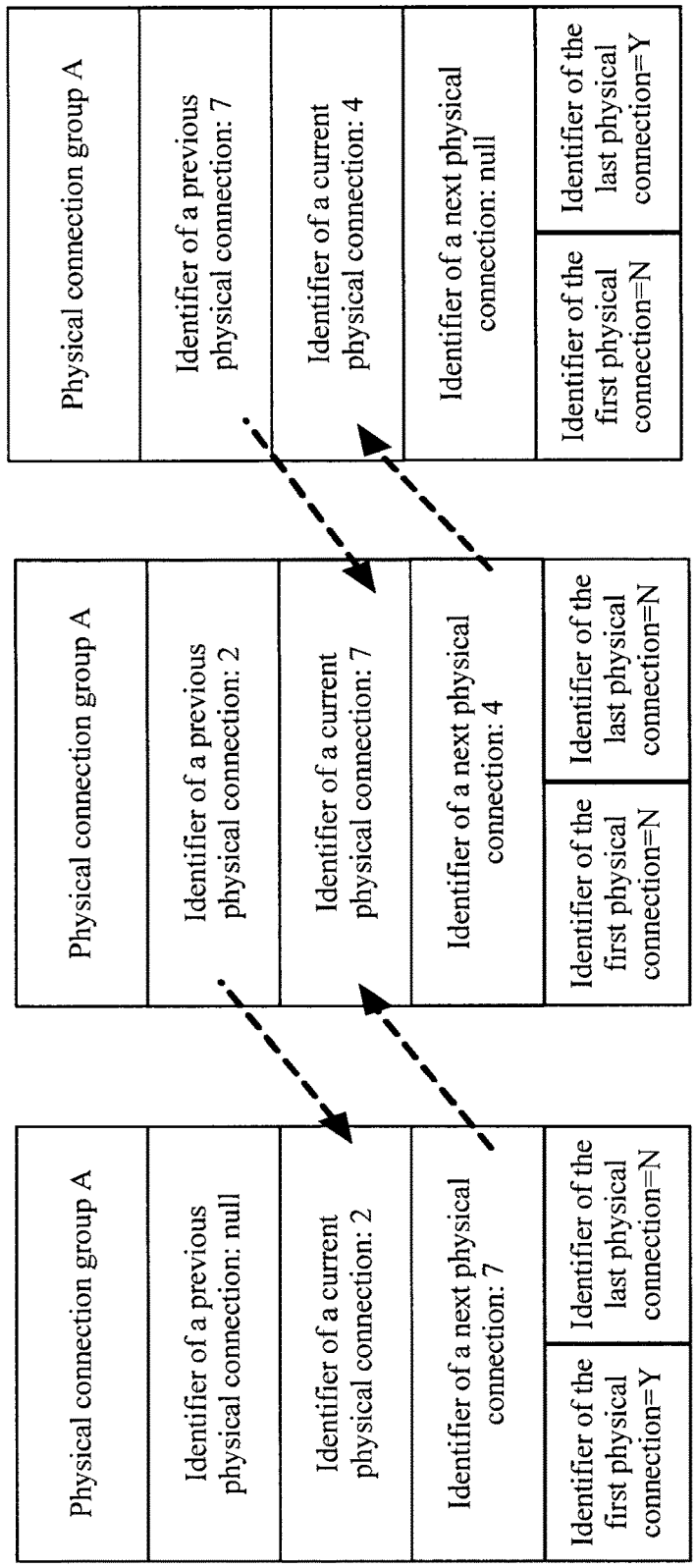
FIG. 7 is an example diagram of an indication manner of a sequence of all physical connections in a physical connection group according to an embodiment of the present disclosure.

Further, it is assumed that the identifier of the physical connection group is A, the physical connection group A includes three physical connections, identifiers of the three physical connections are respectively 2, 7 and 4, and a sequence of the physical connections in the physical connection group A includes a physical connection 2, a physical connection 7, and a physical connection 4. Configuration status information may be transmitted over the three physical connections in a manner described in this embodiment. That is, the physical connection 2 is used to transmit, in the overhead area, information to indicate that the identifier of the physical connection group is A, the identifier of the previous physical connection is null, the identifier of the current physical connection is 2, the identifier of the next physical connection is 7, the first indication information indicates that the current physical connection is the first physical connection in the physical connection group, and the second indication information indicates that the current physical connection is not the last physical connection in the physical connection group, the physical connection 7 is used to transmit, in the overhead area, information to indicate that the identifier of the physical connection group is A, the identifier of the previous physical connection is 2, the identifier of the current physical connection is 7, the identifier of the next physical connection is 4, the first indication information indicates that the current physical connection is not the first physical connection in the physical connection group, and the second indication information indicates that the current physical connection is not the last physical connection in the physical connection group, and the physical connection 4 is used to transmit, in the overhead area, information to indicate that the identifier of the physical connection group is A, the identifier of the previous physical connection is 7, the identifier of the current physical connection is 4, the identifier of the next physical connection is null, the first indication information indicates that the current physical connection is not the first physical connection in the physical connection group, and the second indication information indicates that the current physical connection is the last physical connection in the physical connection group. After receiving the three types of configuration status information, the receive end obtains the sequence relationship between the physical connections by means of combination in a linking manner shown by arrows in FIG. 7, that is, the physical connection 2→the physical connection 7→the physical connection 4, and this means that the sequence of all physical connections in the physical connection group is identified in a two-way linked list manner.

Figure 8:
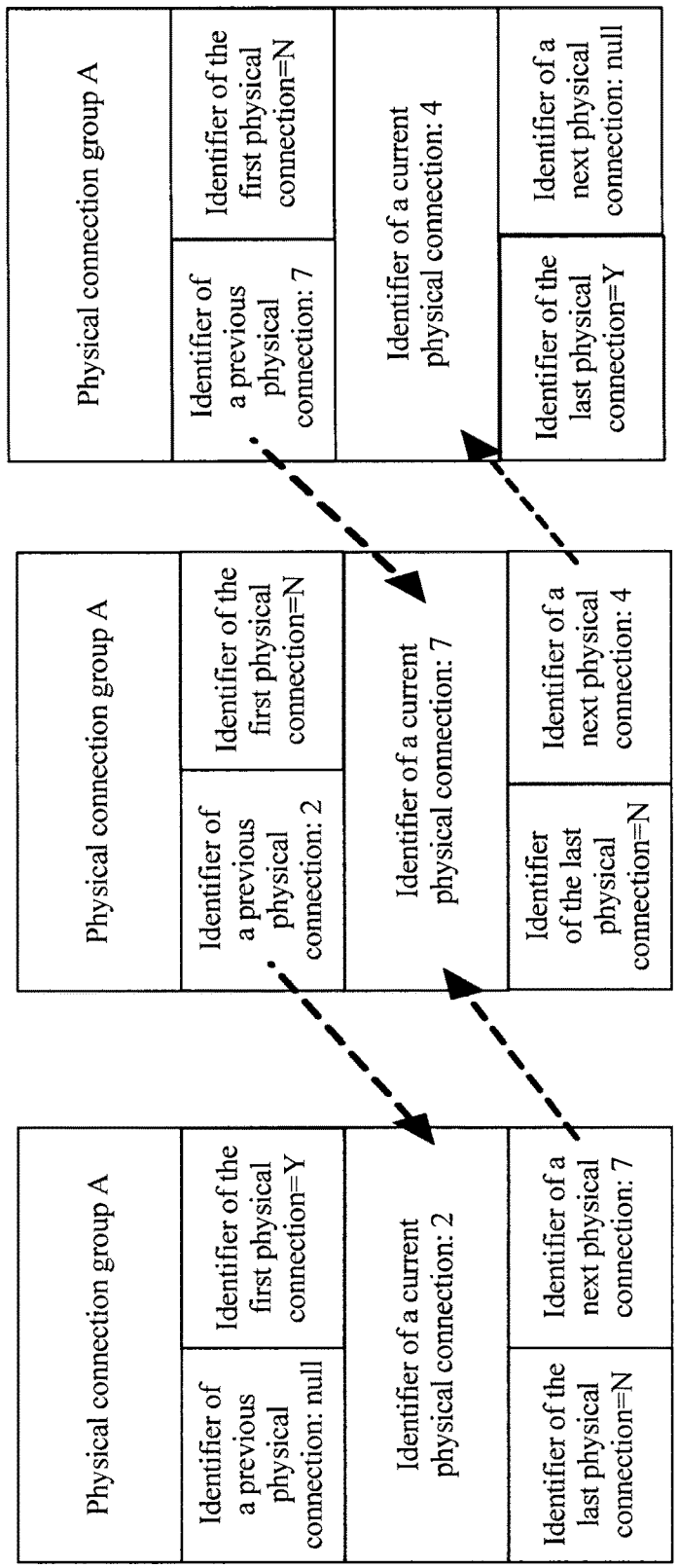
FIG. 8 is an example diagram of an indication manner of a sequence of all physical connections in a physical connection group according to an embodiment of the present disclosure.

Optionally, in an embodiment, the configuration status information of each physical connection in the physical connection group includes an identifier of each physical connection, an identifier of the previous physical connection of each physical connection in the physical connection group, an identifier of the next physical connection of each physical connection in the physical connection group, information used to indicate whether the previous physical connection of each physical connection is the first physical connection in the physical connection group, and information used to indicate whether the next physical connection of each physical connection is the last physical connection in the physical connection group. For details, refer to FIG. 8. In this embodiment, a sequence of all physical connections in the physical connection group is also identified in a two-way linked list manner.

Figure 9:
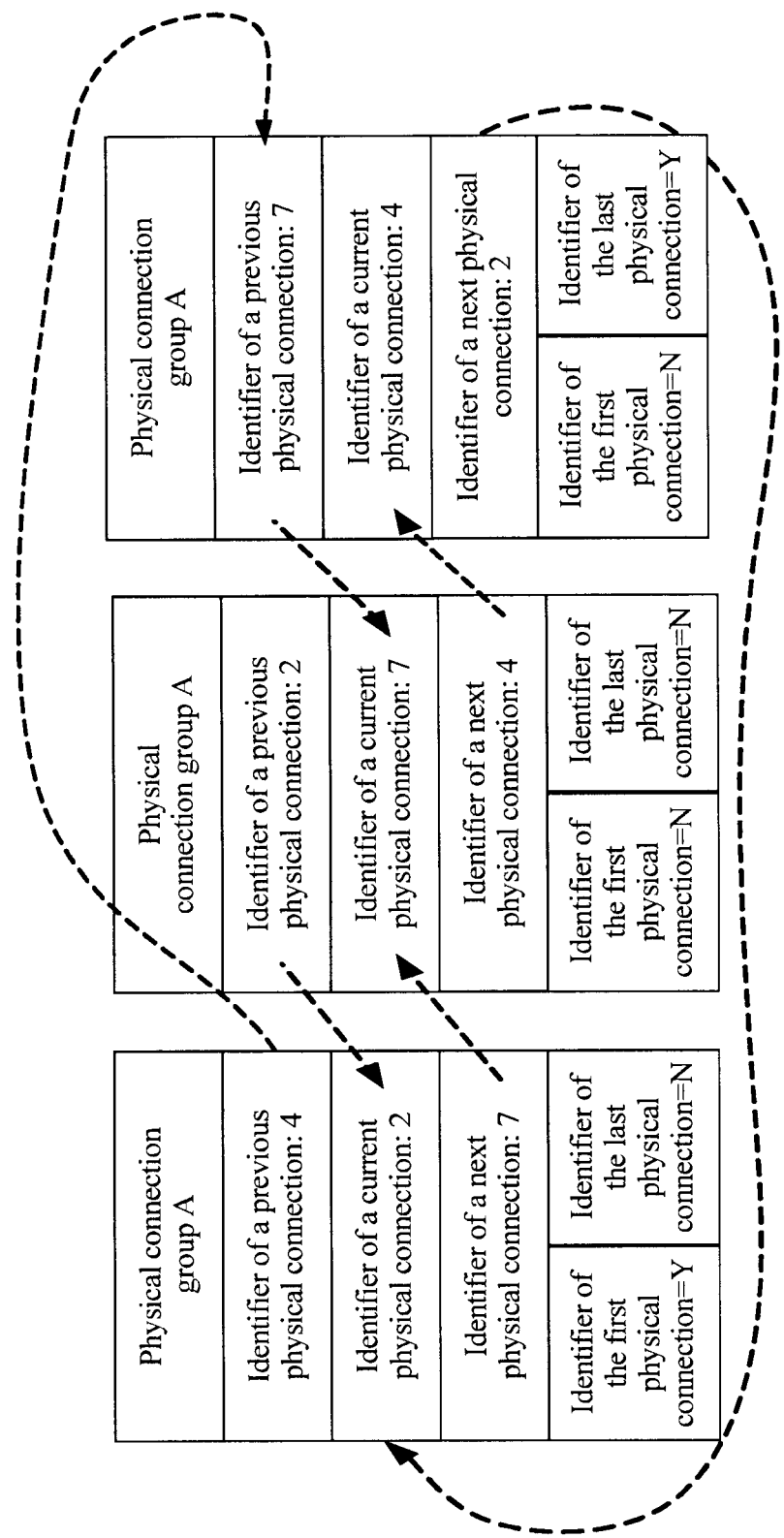
FIG. 9 is an example diagram of an indication manner of a sequence of all physical connections in a physical connection group according to an embodiment of the present disclosure.

Optionally, in an embodiment, a previous physical connection of the first physical connection in the physical connection group may be set to the last physical connection in the physical connection group, and a next physical connection of the last physical connection in the physical connection group may be set to the first physical connection in the physical connection group, that is, a sequence of all physical connections in the physical connection group is identified in a two-way ring linked list manner. For details, refer to FIG. 9.

Optionally, in an embodiment, the sub-stream transmitted over each physical connection further includes third indication information, and the method in FIG. 3 may further include negotiating, using the third indication information, with the receive end to update the physical connection group when a quantity of physical connections in the physical connection group and/or the sequence of the physical connections in the physical connection group change or changes.

For ease of description, a change of the quantity of the physical connections in the physical connection group and/or a change of the sequence of the physical connections in the physical connection group are/is referred to as a configuration update of the physical connection group. The foregoing third indication information may be used for interactive negotiation between the transmit end and the receive end during the configuration update of the physical connection group. For example, the third indication information includes 2 bits: one bit is used by the transmit end to request the configuration update of the physical connection group, and the other bit is used by the receive end to confirm the configuration update of the physical connection group. In addition, the foregoing third indication information may be carried over each physical connection in an overhead code block, that is, a part of the overhead area.

In this embodiment of the present disclosure, a configuration update of a physical connection group between a transmit end and a receive end is indicated using third indication information. In comparison with a manner, in the other approaches, of negotiating the configuration update of the physical connection group using PHY Map Request and PHY Map Active, this reduces resources in an overhead area and improves efficiency of the configuration update of the physical connection group.

It should be understood that the receive end and the transmit end may first negotiate the configuration update of the physical connection group using the foregoing third indication information, and stipulate that data streams in a current frame period are still transmitted and received based on configuration that is of the physical connection group and that is not updated. New configuration is sent to the receive end in the current frame period. The receive end receives configuration information of the physical connection group, and obtains updated global configuration. In a next frame period or n frame periods (a specific time may be negotiated by the transmit end and the receive end) of the current frame period in which the updated configuration information is received, the transmit end and the receive end, transmit and receive the data streams according to the updated configuration that is of the physical connection group and that is confirmed by means of negotiation. By analogy, pipelines for a configuration update and a data update are formed. For details, refer to Table 2.

TABLE 2

A table of a relationship between a configuration update of a physical connection group and configuration that is of the physical connection group and on which data transmission and reception are based

|  | Basic frame period 1 | Basic frame period 2 | Basic frame period 3 | Basic frame period 4 | Basic frame period 5 |
| --- | --- | --- | --- | --- | --- |
| Configuration of a physical connection group A | Next configuration of the physical connection group A is configuration 1 | Next configuration of the physical connection group A is configuration 2 | Next configuration of the physical connection group A is configuration 3 | Next configuration of the physical connection group A is configuration 4 | . . . |
| Data transmission and reception | . . . | The data transmission and reception are performed based on configuration 1 of the configuration of the physical connection group A | The data transmission and reception are performed based on configuration 2 of the configuration of the physical connection group A | The data transmission and reception are performed based on configuration 3 of the configuration of the physical connection group A | The data transmission and reception are performed based on configuration 4 of the configuration of the physical connection group A |

It can be learned from Table 2 that even if the configuration of the physical connection group is updated in a super frame period, before the next basic frame period arrives, the data transmission and reception in a current basic frame period are still performed based on configuration that is of the physical connection group and that is not updated.

It should be noted that a specific form and usage of the foregoing third indication information may be determined according to a situation. Optionally, in an implementation, the third indication information may include only one bit, for example, an acknowledgment bit (i.e., ack) shown in FIG. 25, and the acknowledgment bit is used by the receive end to confirm a configuration update of the physical connection group. The following describes in detail a configuration update process of the physical connection group based on one acknowledgment bit with reference to FIG. 10.

Figure 10:
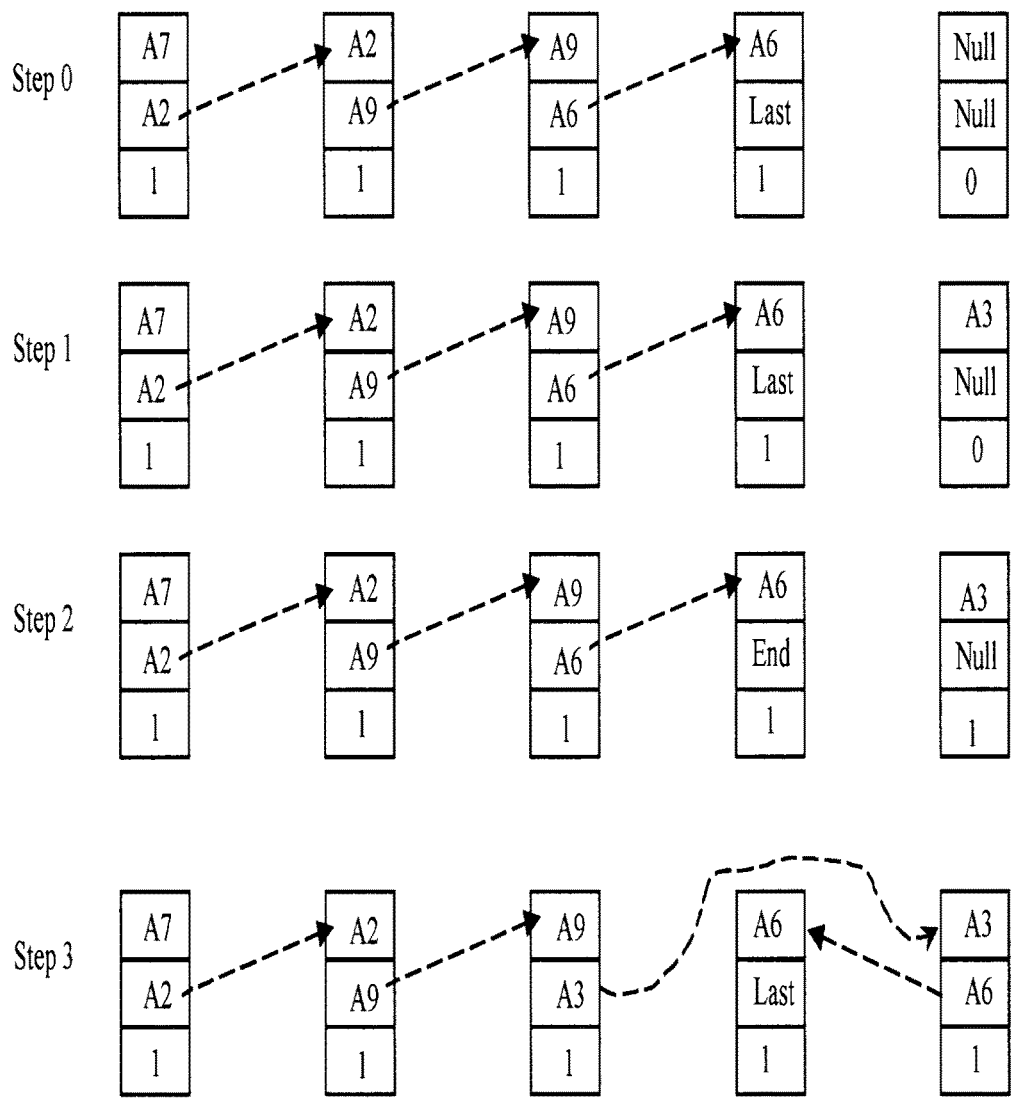
FIG. 10 is an example diagram of a configuration update process of a physical connection group according to an embodiment of the present disclosure.

It is assumed that a physical connection group includes four physical connections before a configuration update, which are a physical connection A7, a physical connection A2, a physical connection A9, and a physical connection A6 in sequence. After the configuration update, a physical connection A3 is added to a physical connection group. The configuration update process of the physical connection group may be performed in a manner shown in FIG. 10. It should be noted that an identifier A7 of a physical connection in FIG. 10 may represent a physical connection whose Group ID=A and whose This PHY=7. Certainly, Group ID is optionally carried. Group ID may be carried in a sub-stream of each physical connection, or Group ID may be carried only over the first physical connection or some physical connections. When values of This PHY of physical connections between physical connection groups are different, even the Group ID may not be carried. Specific steps of the configuration update process of the physical connection group described in FIG. 10 are as follows.

Step 0: Before a configuration update of a physical connection group, a data stream is transmitted over a physical connection in the physical connection group according to configuration that is not updated.

Step 1: Configuration of the physical connection group is updated by adding a new physical connection A3 to the physical connection group.

In step 1, a connection relationship between A3 and another physical connection in the physical connection group may not be first indicated. The new physical connection A3 is added to the physical connection group, and this means that a request for a configuration update of the physical connection group is sent to a receive end in an implicit manner.

Step 2: A receive end confirms the configuration update of the physical connection group, and sets an acknowledgment bit A (i.e., for Ack) in an overhead area to 1.

Step 3: A transmit end transmits a data stream according to updated configuration of the physical connection group.

In this case, the transmit end needs to change a connection relationship (as shown by arrows in step 3 in FIG. 10) between members in the physical connection group to complete the configuration update of the physical connection group.

Optionally, in another implementation, a request bit R (i.e., for Request) and an acknowledgment bit A that are shown in FIG. 26 may be set in an overhead area. The request bit R is used by a transmit end to send a request for a configuration update of a physical connection group, and the acknowledgment bit A is used by a receive end to confirm a configuration update of the physical connection group.

Figure 11:
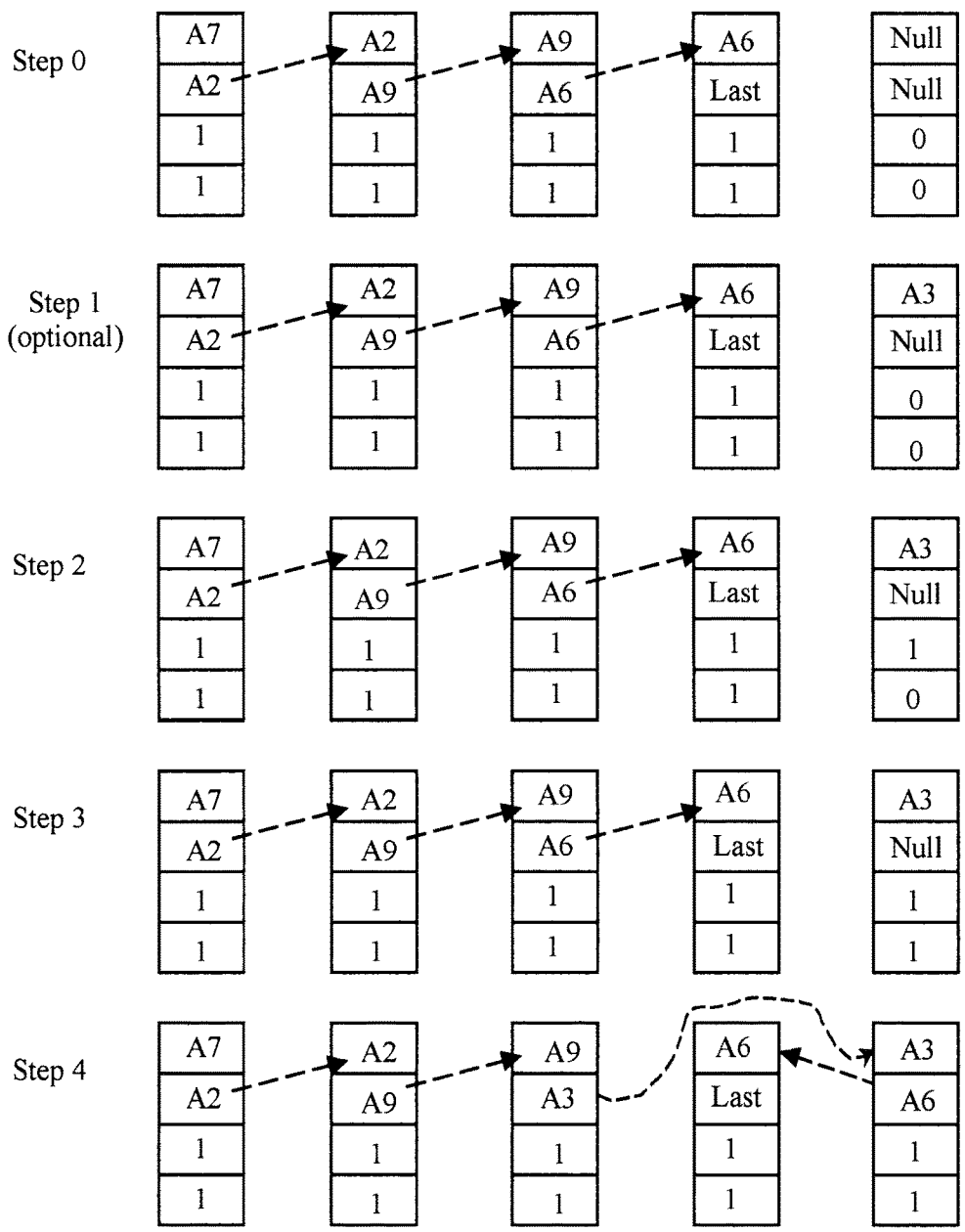
FIG. 11 is an example diagram of a configuration update process of a physical connection group according to an embodiment of the present disclosure.

It is assumed that a physical connection group obtained before a configuration update includes four physical connections, which are a physical connection A7, a physical connection A2, a physical connection A9, and a physical connection A6 in sequence. After the configuration update, a physical connection A3 is added to a physical connection group. The following describes in detail a configuration update process of the physical connection group based on a request bit and an acknowledgment bit with reference to FIG. 11. Specific steps are as follows.

Step 0: Before a configuration update of a physical connection group, a data stream is transmitted over a physical connection in the physical connection group according to configuration that is not updated.

Step 1: Configuration of the physical connection group is updated by adding a new physical connection A3 to the physical connection group.

This step is an optional step, and step 2 may be directly performed without performing step 1.

Step 2: A transmit end sets a request bit R in an overhead area to 1, and sends a request for a configuration update of the physical connection group to a receive end.

Step 3: The receive end sets an acknowledgment bit A in the overhead area to 1, and confirms the configuration update of the physical connection group.

Step 4: The transmit end transmits a data stream according to updated configuration of the physical connection group.

In this case, the transmit end needs to change a connection relationship (as shown by arrows in step 4 in FIG. 11) between members in the physical connection group to complete the configuration update of the physical connection group.

The foregoing describes, from a perspective of the transmit end, in detail the method for transmitting a data stream in a flexible Ethernet according to the embodiments of the present disclosure with reference to FIG. 1 to FIG. 11. The following describes, from a perspective of the receive end, a method for transmitting a data stream in a flexible Ethernet according to an embodiment of the present disclosure with reference to FIG. 12.

It should be understood that interaction between the transmit end and the receive end, related features and functions, and the like that are described from a perspective of a transmit end are corresponding to those described from the perspective of the receive end. For brevity, repeated description is appropriately omitted.

Figure 12:
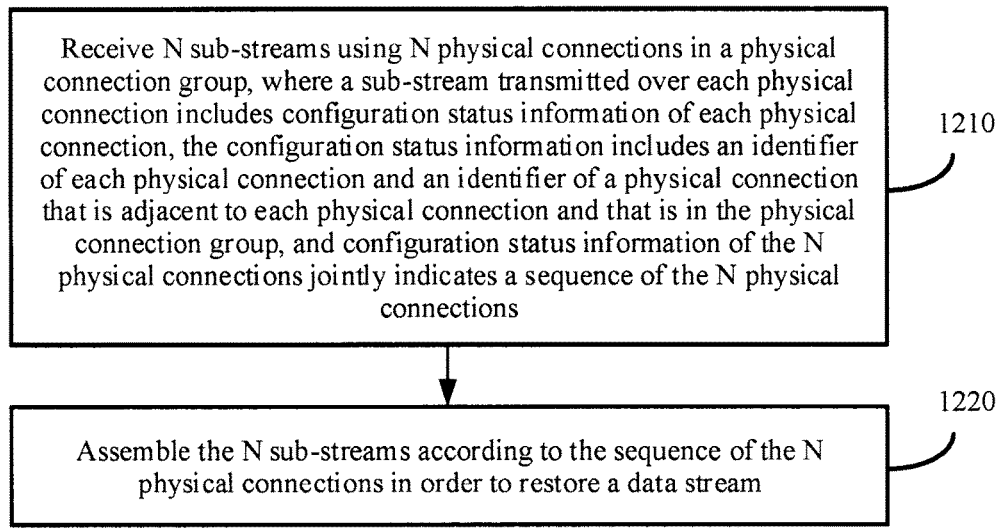
FIG. 12 is a schematic flowchart of a method for transmitting a data stream in a flexible Ethernet according to an embodiment of the present disclosure.

FIG. 12 is a schematic flowchart of a method for transmitting a data stream in a flexible Ethernet according to an embodiment of the present disclosure. The method in FIG. 12 includes the following steps.

Step 1210: Receive N sub-streams using N physical connections in a physical connection group, where a sub-stream transmitted over each physical connection includes configuration status information of each physical connection, the configuration status information includes an identifier of each physical connection and an identifier of a physical connection that is adjacent to each physical connection and that is in the physical connection group, and configuration status information of the N physical connections jointly indicates a sequence of the N physical connections.

Step 1220: Assemble the N sub-streams according to the sequence of the N physical connections in order to restore a data stream.

It should be understood that, in step 1220, the sequence that is of the N physical connections and based on which a receive end restores the data stream is not necessarily obtained from the configuration status information of the N physical connections in step 1210. For example, a sequence of all physical connections in the physical connection group may be obtained in step 1210, or a sequence that is of all physical connections in the physical connection group and that has been previously obtained may be used.

In this embodiment of the present disclosure, identifiers of a physical connection and a physical connection adjacent to the physical connection are carried in a sub-stream of each physical connection. Therefore, a receive end can restore a sequence relationship between all physical connections in a physical connection group using a local adjacency relationship between all the physical connections in the physical connection group. In comparison with a conventional manner in which multiple maps are transmitted, this reduces overheads required for identifying a sequence of all the physical connections in the physical connection group and improves transmission efficiency.

Optionally, in an embodiment, the method in FIG. 12 may further include determining, according to identifiers of the N physical connections, the N physical connections included in the physical connection group, and determining the sequence of the N physical connections according to identifiers of adjacent physical connections of the N physical connections.

Optionally, in an embodiment, the configuration status information of each physical connection in the physical connection group may be included in an overhead code block of the sub-stream transmitted over each physical connection.

Optionally, in an embodiment, the physical connection that is adjacent to each physical connection and that is in the physical connection group includes a previous physical connection of each physical connection in the physical connection group, and/or a next physical connection of each physical connection in the physical connection group.

Optionally, in an embodiment, the configuration status information of each physical connection further includes first indication information and/or second indication information, where the first indication information is used to indicate whether each physical connection is the first physical connection in the physical connection group, and the second indication information is used to indicate whether each physical connection is the last physical connection in the physical connection group.

Optionally, in an embodiment, the sub-stream transmitted over each physical connection further includes third indication information, and the method in FIG. 12 may further include negotiating, using the third indication information, with a transmit end to update the physical connection group when a quantity of physical connections in the physical connection group and/or the sequence of the physical connections in the physical connection group change or changes.

Optionally, in an embodiment, the sub-stream transmitted over each physical connection in the physical connection group further includes an identifier of the physical connection group.

Optionally, in an embodiment, the configuration status information of each physical connection in the physical connection group is periodically transmitted in basic frames.

The foregoing describes in detail the method for transmitting a data stream in a flexible Ethernet according to the embodiments of the present disclosure with reference to FIG. 1 to FIG. 12. The following describes in detail transmitters and receivers according to embodiments of the present disclosure with reference to FIG. 13 to FIG. 16.

Figure 13:
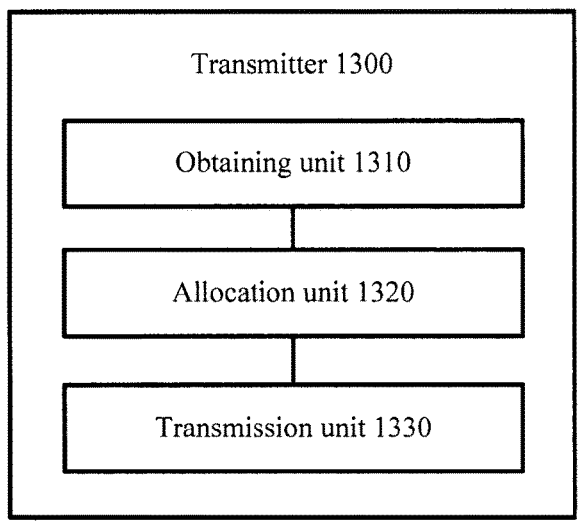
FIG. 13 is a schematic structural diagram of a transmitter according to an embodiment of the present disclosure.

FIG. 13 is a schematic structural diagram of a transmitter 1300 according to an embodiment of the present disclosure. It should be understood that the transmitter 1300 in FIG. 13 can implement all the steps of the method described in FIG. 3. To avoid repetition, details are not described herein again. The transmitter 1300 includes an obtaining unit 1310 configured to obtain a to-be-transmitted data stream, where the data stream is to be transmitted using a physical connection group between a transmit end and a receive end, and the physical connection group includes N physical connections, an allocation unit 1320 configured to allocate the data stream to the N physical connections according to a sequence of the N physical connections in the physical connection group in order to obtain N sub-streams respectively corresponding to the N physical connections, and a transmission unit 1330 configured to transmit the N sub-streams using the N physical connections, where a sub-stream transmitted over each physical connection includes configuration status information of each physical connection, the configuration status information includes an identifier of each physical connection and an identifier of a physical connection that is adjacent to each physical connection and that is in the physical connection group, and configuration status information of the N physical connections jointly indicates the sequence of the N physical connections.

In this embodiment of the present disclosure, identifiers of a physical connection and a physical connection adjacent to the physical connection are carried in a sub-stream of each physical connection. Therefore, a receive end can restore a sequence relationship between all physical connections in a physical connection group using a local adjacency relationship between all the physical connections in the physical connection group. In comparison with a conventional manner in which configuration interaction maps of the physical connection group are transmitted, this reduces, in a data stream transmission process, overheads required for identifying a sequence of all the physical connections in the physical connection group and improves transmission efficiency.

Optionally, in an embodiment, the configuration status information of each physical connection is included in an overhead code block of the sub-stream transmitted over each physical connection.

Optionally, in an embodiment, the physical connection that is adjacent to each physical connection and that is in the physical connection group includes a previous physical connection of each physical connection in the physical connection group, and/or a next physical connection of each physical connection in the physical connection group.

Optionally, in an embodiment, the configuration status information of each physical connection further includes first indication information and/or second indication information, where the first indication information is used to indicate whether each physical connection is the first physical connection in the physical connection group, and the second indication information is used to indicate whether each physical connection is the last physical connection in the physical connection group.

Optionally, in an embodiment, the sub-stream transmitted over each physical connection further includes third indication information, and the transmitter 1300 further includes a negotiation unit (not shown) configured to negotiate, using the third indication information, with the receive end to update the physical connection group when a quantity of physical connections in the physical connection group and/or the sequence of the physical connections in the physical connection group change or changes.

Optionally, in an embodiment, the sub-stream transmitted over each physical connection further includes an identifier of the physical connection group.

Optionally, in an embodiment, the configuration status information of each physical connection is periodically transmitted in basic frames.

Figure 14:
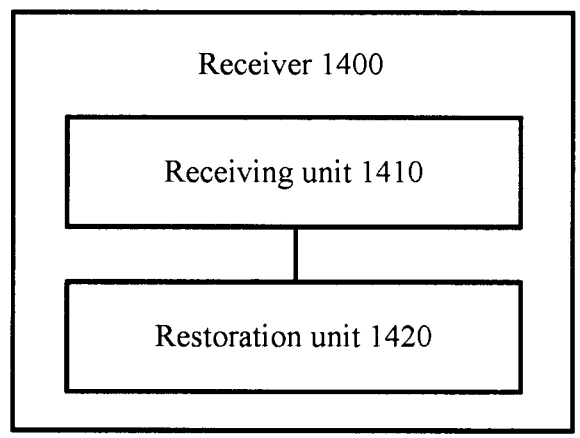
FIG. 14 is a schematic block diagram of a receiver according to an embodiment of the present disclosure.

FIG. 14 is a schematic block diagram of a receiver 1400 according to an embodiment of the present disclosure. It should be understood that the receiver 1400 in FIG. 14 can implement all the steps of the method described in FIG. 12.

To avoid repetition, details are not described herein again. The receiver 1400 includes a receiving unit 1410 configured to receive N sub-streams using N physical connections in a physical connection group, where a sub-stream transmitted over each physical connection includes configuration status information of each physical connection, the configuration status information includes an identifier of each physical connection and an identifier of a physical connection that is adjacent to each physical connection and that is in the physical connection group, and configuration status information of the N physical connections jointly indicates a sequence of the N physical connections, and a restoration unit 1420 configured to assemble the N sub-streams according to the sequence of the N physical connections in order to restore the data stream.

In this embodiment of the present disclosure, identifiers of a physical connection and a physical connection adjacent to the physical connection are carried in a sub-stream of each physical connection. Therefore, a receive end can restore a sequence relationship between all physical connections in a physical connection group using a local adjacency relationship between all the physical connections in the physical connection group. In comparison with a conventional manner in which configuration interaction maps of the physical connection group are transmitted, this reduces, in a data stream transmission process, overheads required for identifying a sequence of all the physical connections in the physical connection group and improves transmission efficiency.

Optionally, in an embodiment, the receiver 1400 further includes a first determining unit (not shown) configured to determine, according to identifiers of the N physical connections, the N physical connections included in the physical connection group, and a second determining unit (not shown) configured to determine the sequence of the N physical connections according to identifiers of adjacent physical connections of the N physical connections.

Optionally, in an embodiment, the configuration status information of each physical connection is included in an overhead code block of the sub-stream transmitted over each physical connection.

Optionally, in an embodiment, the physical connection that is adjacent to each physical connection and that is in the physical connection group includes a previous physical connection of each physical connection in the physical connection group, and/or a next physical connection of each physical connection in the physical connection group.

Optionally, in an embodiment, the configuration status information of each physical connection further includes first indication information and/or second indication information, where the first indication information is used to indicate whether each physical connection is the first physical connection in the physical connection group, and the second indication information is used to indicate whether each physical connection is the last physical connection in the physical connection group.

Optionally, in an embodiment, the sub-stream transmitted over each physical connection further includes third indication information, and the receiver 1400 further includes a negotiation unit (not shown) configured to negotiate, using a third indication information, with the transmit end to update the physical connection group when a quantity of physical connections in the physical connection group and/or the sequence of the physical connections in the physical connection group change or changes.

Optionally, in an embodiment, the sub-stream transmitted over each physical connection further includes an identifier of the physical connection group.

Optionally, in an embodiment, the configuration status information of each physical connection is periodically transmitted in basic frames.

Figure 15:
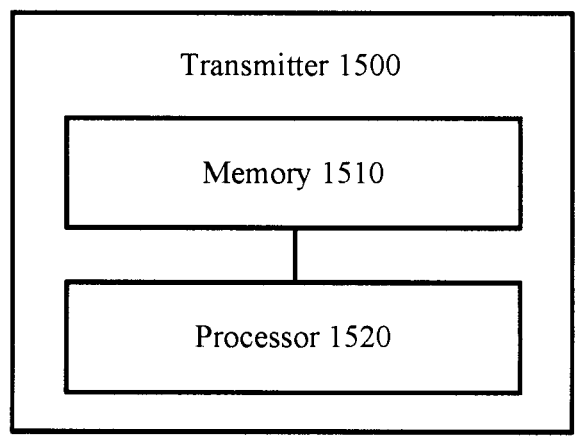
FIG. 15 is a schematic structural diagram of a transmitter according to an embodiment of the present disclosure.

FIG. 15 is a schematic structural diagram of a transmitter 1500 according to an embodiment of the present disclosure. It should be understood that the transmitter 1500 in FIG. 15 can implement all the steps of the method described in FIG. 3. To avoid repetition, details are not described herein again. The transmitter 1500 includes a memory 1510 configured to store a program, and a processor 1520 configured to execute the program, where when the program is executed, the processor 1520 is configured to obtain a to-be-transmitted data stream, where the data stream is to be transmitted using a physical connection group between a transmit end and a receive end, and the physical connection group includes N physical connections, allocate the data stream to the N physical connections according to a sequence of the N physical connections in the physical connection group in order to obtain N sub-streams respectively corresponding to the N physical connections, and transmit the N sub-streams using the N physical connections, where a sub-stream transmitted over each physical connection includes configuration status information of each physical connection, the configuration status information includes an identifier of each physical connection and an identifier of a physical connection that is adjacent to each physical connection and that is in the physical connection group, and configuration status information of the N physical connections jointly indicates the sequence of the N physical connections.

In this embodiment of the present disclosure, identifiers of a physical connection and a physical connection adjacent to the physical connection are carried in a sub-stream of each physical connection. Therefore, a receive end can restore a sequence relationship between all physical connections in a physical connection group using a local adjacency relationship between all the physical connections in the physical connection group. In comparison with a conventional manner in which configuration interaction maps of the physical connection group are transmitted, this reduces, in a data stream transmission process, overheads required for identifying a sequence of all the physical connections in the physical connection group and improves transmission efficiency.

Optionally, in an embodiment, the configuration status information of each physical connection is included in an overhead code block of the sub-stream transmitted over each physical connection.

Optionally, in an embodiment, the physical connection that is adjacent to each physical connection and that is in the physical connection group includes a previous physical connection of each physical connection in the physical connection group, and/or a next physical connection of each physical connection in the physical connection group.

Optionally, in an embodiment, the configuration status information of each physical connection further includes first indication information and/or second indication information, where the first indication information is used to indicate whether each physical connection is the first physical connection in the physical connection group, and the second indication information is used to indicate whether each physical connection is the last physical connection in the physical connection group.

Optionally, in an embodiment, the sub-stream transmitted over each physical connection further includes third indication information, and the processor 1520 is further configured to negotiate, using the third indication information, with the receive end to update the physical connection group when a quantity of physical connections in the physical connection group and/or the sequence of the physical connections in the physical connection group change or changes.

Optionally, in an embodiment, the sub-stream transmitted over each physical connection further includes an identifier of the physical connection group.

Optionally, in an embodiment, the configuration status information of each physical connection is periodically transmitted in basic frames.

Figure 16:
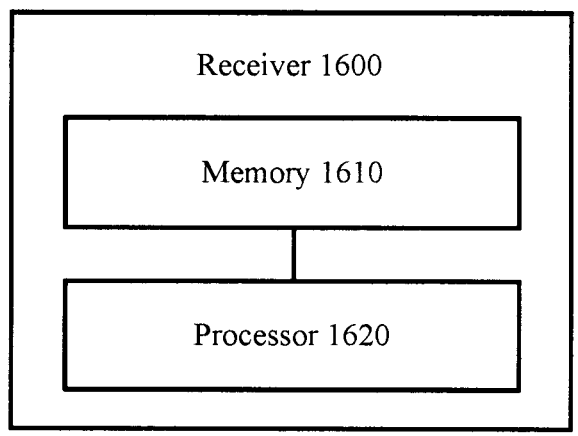
FIG. 16 is a schematic block diagram of a receiver according to an embodiment of the present disclosure.

FIG. 16 is a schematic block diagram of a receiver 1600 according to an embodiment of the present disclosure. It should be understood that the receiver 1600 in FIG. 16 can implement all the steps of the method described in FIG. 12. To avoid repetition, details are not described herein again. The receiver 1600 includes a memory 1610 configured to store a program, and a processor 1620 configured to execute the program, where when the program is executed, the processor 1620 is configured to receive N sub-streams using N physical connections in a physical connection group, where a sub-stream transmitted over each physical connection includes configuration status information of each physical connection, the configuration status information includes an identifier of each physical connection and an identifier of a physical connection that is adjacent to each physical connection and that is in the physical connection group, and configuration status information of the N physical connections jointly indicates a sequence of the N physical connections, and assemble the N sub-streams according to the sequence of the N physical connections in order to restore the data stream.

In this embodiment of the present disclosure, identifiers of a physical connection and a physical connection adjacent to the physical connection are carried in a sub-stream of each physical connection. Therefore, a receive end can restore a sequence relationship between all physical connections in a physical connection group using a local adjacency relationship between all the physical connections in the physical connection group. In comparison with a conventional manner in which configuration interaction maps of the physical connection group are transmitted, this reduces, in a data stream transmission process, overheads required for identifying a sequence of all the physical connections in the physical connection group and improves transmission efficiency.

Optionally, in an embodiment, the processor 1620 is further configured to determine, according to identifiers of the N physical connections, the N physical connections included in the physical connection group, and determine the sequence of the N physical connections according to identifiers of adjacent physical connections of the N physical connections.

Optionally, in an embodiment, the configuration status information of each physical connection is included in an overhead code block of the sub-stream transmitted over each physical connection.

Optionally, in an embodiment, the physical connection that is adjacent to each physical connection and that is in the physical connection group includes a previous physical connection of each physical connection in the physical connection group, and/or a next physical connection of each physical connection in the physical connection group.

Optionally, in an embodiment, the configuration status information of each physical connection further includes first indication information and/or second indication information, where the first indication information is used to indicate whether each physical connection is the first physical connection in the physical connection group, and the second indication information is used to indicate whether each physical connection is the last physical connection in the physical connection group.

Optionally, in an embodiment, the sub-stream transmitted over each physical connection further includes third indication information, and the processor 1620 is further configured to negotiate, using a third indication information, with the transmit end to update the physical connection group when a quantity of physical connections in the physical connection group and/or the sequence of the physical connections in the physical connection group change or changes.

Optionally, in an embodiment, the sub-stream transmitted over each physical connection further includes an identifier of the physical connection group.

Optionally, in an embodiment, the configuration status information of each physical connection is periodically transmitted in basic frames.

Figure 17:
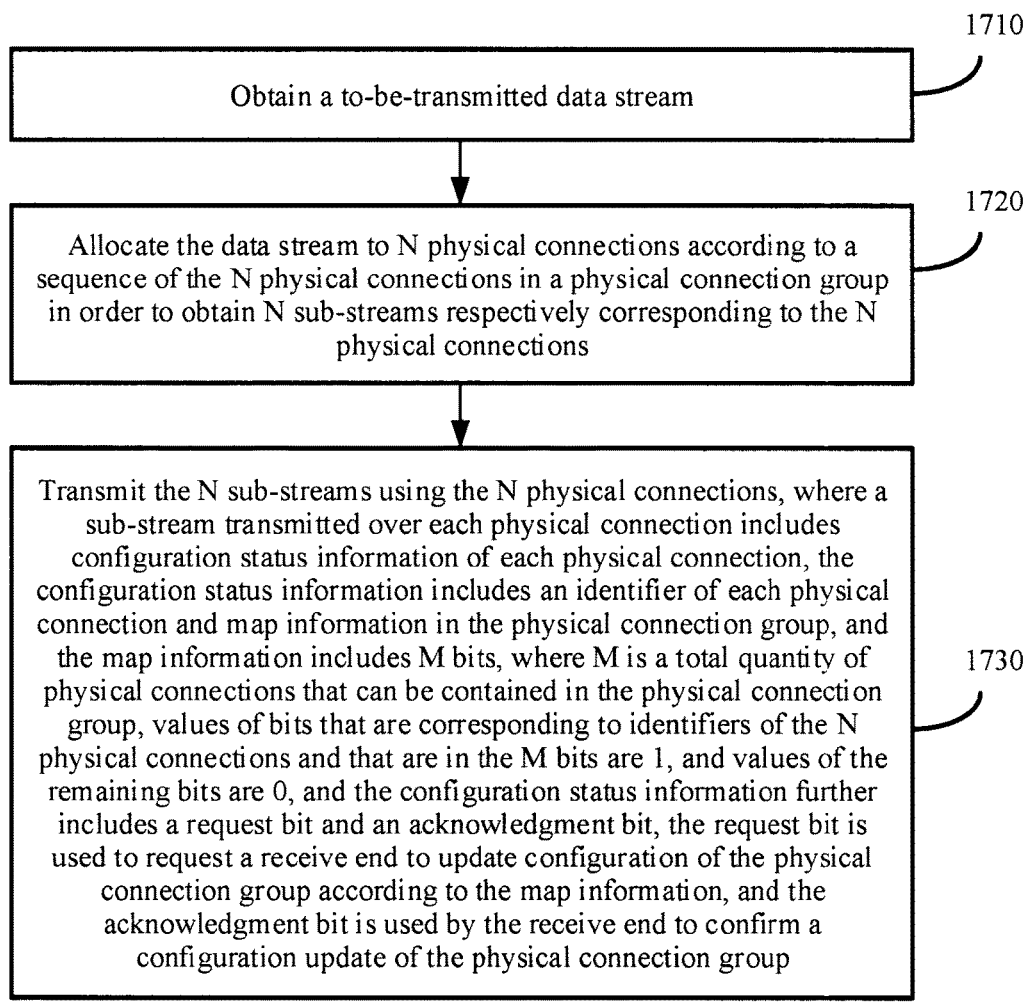
FIG. 17 is a schematic flowchart of a method for transmitting a data stream in a flexible Ethernet according to another embodiment of the present disclosure.

The following provides another embodiment of the present disclosure with reference to FIG. 17.

FIG. 17 is a schematic flowchart of a method for transmitting a data stream in a flexible Ethernet according to another embodiment of the present disclosure. The method in FIG. 17 may be performed by a transmit end, and the method includes the following steps.

Step 1710: Obtain a to-be-transmitted data stream, where the data stream is to be transmitted using a physical connection group between a transmit end and a receive end, and the physical connection group includes N physical connections.

Step 1720: Allocate the data stream to the N physical connections according to a sequence of the N physical connections in the physical connection group in order to obtain N sub-streams respectively corresponding to the N physical connections.

Step 1730: Transmit the N sub-streams using the N physical connections, where a sub-stream transmitted over each physical connection includes configuration status information of each physical connection, the configuration status information includes an identifier of each physical connection and map information in the physical connection group, and the map information includes M bits, where M is a total quantity of physical connections that can be contained in the physical connection group, values of bits that are corresponding to identifiers of the N physical connections and that are in the M bits are 1, and values of the remaining bits are 0, and the configuration status information further includes a request bit and an acknowledgment bit, the request bit is used to request the receive end to update configuration of the physical connection group according to the map information, and the acknowledgment bit is used by the receive end to confirm a configuration update of the physical connection group.

During a configuration update of a physical connection group, protocol interaction and negotiation need to be performed between a transmit end and a receive end. In the other approaches, the protocol interaction and the negotiation are performed by transmitting multiple maps (including a request map PHY Map Request and an activation map PHY Map Active). The maps include an excessively large amount of information, and much redundant information is sent when the protocol interaction is implemented by transmitting different maps. Consequently, transmission efficiency is excessively low. In this embodiment of the present disclosure, a request bit and an acknowledgment bit are set, and a process of the protocol interaction is implemented using extra bits. In this case, the transmit end and the receive end need to transmit only one map that represents configuration of the physical connection group. In comparison with the other approaches, the transmission efficiency is improved.

Optionally, in an embodiment, the configuration status information of each physical connection is included in an overhead code block of the sub-stream transmitted over each physical connection.

Optionally, in an embodiment, the configuration status information of each physical connection is periodically transmitted in basic frames.

Optionally, in an embodiment, the sub-stream transmitted over each physical connection further includes an identifier of the physical connection group.

The following gives description using FIGS. 27 and 28 as examples.

It can be learned from FIGS. 27 and 28 that a total of four bytes in an overhead area that includes four overhead code blocks in one basic period are used to transmit configuration status information of a physical connection. As described in the other approaches, an identifier This PHY of the physical connection includes 8 bits, and therefore one physical connection group includes a maximum of 256 physical connections. The identifier of the physical connection, an identifier of the physical connection group, and map information of the physical connection group may be transmitted in a manner shown in FIG. 29.

FIG. 29 shows information that is transmitted over one physical connection in 10 basic frame periods. It can be learned from FIG. 29 that, in this embodiment of the present disclosure, the transmission of the configuration status information may be completed in the 10 basic frame periods. In comparison with the other approaches, transmission efficiency is improved.

FIG. 18 is a schematic flowchart of a method for transmitting a data stream in a flexible Ethernet according to another embodiment of the present disclosure. The method in FIG. 18 may be performed by a receive end, and the method includes the following steps.

Step 1810: Receive N sub-streams using N physical connections in a physical connection group, where a sub-stream transmitted over each physical connection includes configuration status information of each physical connection, the configuration status information includes an identifier of each physical connection and map information in the physical connection group, and the map information includes M bits, where M is a total quantity of physical connections that can be contained in the physical connection group, values of bits that are corresponding to identifiers of the N physical connections and that are in the M bits are 1, and values of the remaining bits are 0, and the configuration status information further includes a request bit and an acknowledgment bit, the request bit is used to request a receive end to update configuration of the physical connection group according to the map information, and the acknowledgment bit is used by the receive end to confirm a configuration update of the physical connection group.

Step 1820: Assemble the N sub-streams according to a sequence of the N physical connections in the physical connection group in order to restore the data stream.

In this embodiment of the present disclosure, a request bit and an acknowledgment bit are set, and a process of protocol interaction is implemented using extra bits. In this case, a transmit end and a receive end need to transmit only one map that represents configuration of a physical connection group. In comparison with the other approaches, transmission efficiency is improved.

Optionally, in an embodiment, the method in FIG. 18 may further include determining the sequence of the N physical connections in the physical connection group according to configuration status information of the N physical connections when the request bit indicates the configuration update of the physical connection group.

It should be understood that, similar to the other approaches, in this embodiment of the present disclosure, a physical connection with a greater identifier indicates that the physical connection is at a more backward location in the physical connection group.

The following describes transmitters and receivers in embodiments of the present disclosure with reference to FIG. 19 to FIG. 22. It should be understood that the transmitters and the receivers in FIG. 19 to FIG. 22 can respectively implement all the steps performed in FIG. 17 by the transmit end and all the steps performed in FIG. 18 by the receive end. To avoid repetition, details are not described herein again.

FIG. 19 is a schematic block diagram of a transmitter 1900 according to another embodiment of the present disclosure. The transmitter 1900 includes an obtaining unit 1910 configured to obtain a to-be-transmitted data stream, where the data stream is to be transmitted using a physical connection group between a transmit end and a receive end, and the physical connection group includes N physical connections, an allocation unit 1920 configured to allocate the data stream to the N physical connections according to a sequence of the N physical connections in the physical connection group in order to obtain N sub-streams respectively corresponding to the N physical connections, and a transmission unit 1930 configured to transmit the N sub-streams using the N physical connections, where a sub-stream transmitted over each physical connection includes configuration status information of each physical connection, the configuration status information includes an identifier of each physical connection and map information in the physical connection group, and the map information includes M bits, where M is a total quantity of physical connections that can be contained in the physical connection group, values of bits that are corresponding to identifiers of the N physical connections and that are in the M bits are 1, and values of the remaining bits are 0, and the configuration status information further includes a request bit and an acknowledgment bit, the request bit is used to request the receive end to update configuration of the physical connection group according to the map information, and the acknowledgment bit is used by a receive end to confirm a configuration update of the physical connection group.

In this embodiment of the present disclosure, a request bit and an acknowledgment bit are set, and a process of protocol interaction is implemented using extra bits. In this case, a transmit end and a receive end need to transmit only one map that represents configuration of a physical connection group. In comparison with the other approaches, transmission efficiency is improved.

Figure 20:
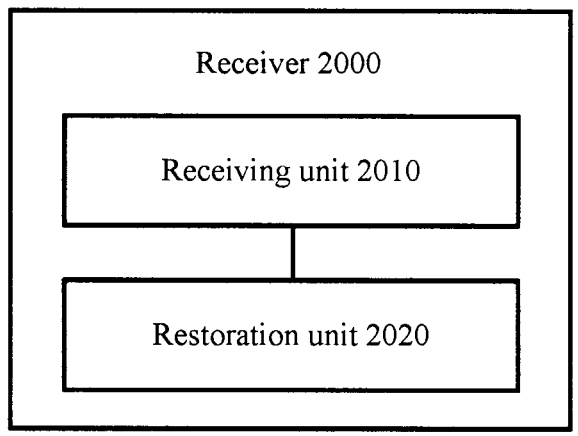
FIG. 20 is a schematic block diagram of a receiver according to another embodiment of the present disclosure.

FIG. 20 is a schematic block diagram of a receiver 2000 according to another embodiment of the present disclosure. The receiver 2000 in FIG. 20 includes a receiving unit 2010 configured to receive N sub-streams using N physical connections in a physical connection group, where a sub-stream transmitted over each physical connection includes configuration status information of each physical connection, the configuration status information includes an identifier of each physical connection and map information in the physical connection group, and the map information includes M bits, where M is a total quantity of physical connections that can be contained in the physical connection group, values of bits that are corresponding to identifiers of the N physical connections and that are in the M bits are 1, and values of the remaining bits are 0, and the configuration status information further includes a request bit and an acknowledgment bit, the request bit is used to request a receive end to update configuration of the physical connection group according to the map information, and the acknowledgment bit is used by a receive end to confirm a configuration update of the physical connection group, and a restoration unit 2020 configured to assemble the N sub-streams according to a sequence of the N physical connections in the physical connection group in order to restore the data stream.

In this embodiment of the present disclosure, a request bit and an acknowledgment bit are set, and a process of protocol interaction is implemented using extra bits. In this case, a transmit end and a receive end need to transmit only one map that represents configuration of a physical connection group. In comparison with the other approaches, transmission efficiency is improved.

Figure 21:
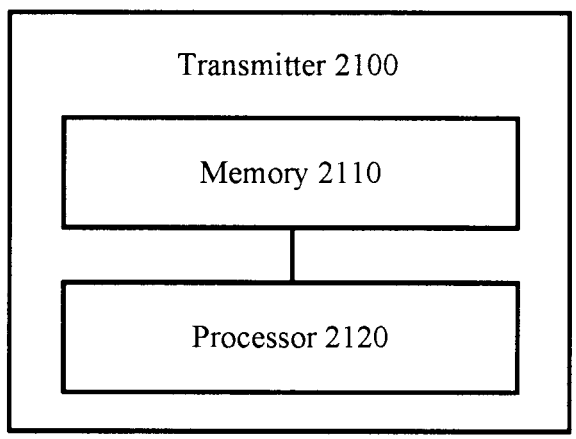
FIG. 21 is a schematic block diagram of a transmitter according to another embodiment of the present disclosure.

FIG. 21 is a schematic block diagram of a transmitter 2100 according to another embodiment of the present disclosure. The transmitter 2100 includes a memory 2110 configured to store a program, and a processor 2120 configured to execute the program, where when the program is executed, the processor 2120 is configured to obtain a to-be-transmitted data stream, where the data stream is to be transmitted using a physical connection group between a transmit end and a receive end, and the physical connection group includes N physical connections, allocate the data stream to the N physical connections according to a sequence of the N physical connections in the physical connection group in order to obtain N sub-streams respectively corresponding to the N physical connections, and transmit the N sub-streams using the N physical connections, where a sub-stream transmitted over each physical connection includes configuration status information of each physical connection, the configuration status information includes an identifier of each physical connection and map information in the physical connection group, and the map information includes M bits, where M is a total quantity of physical connections that can be contained in the physical connection group, values of bits that are corresponding to identifiers of the N physical connections and that are in the M bits are 1, and values of the remaining bits are 0, and the configuration status information further includes a request bit and an acknowledgment bit, the request bit is used to request the receive end to update configuration of the physical connection group according to the map information, and the acknowledgment bit is used by a receive end to confirm a configuration update of the physical connection group.

In this embodiment of the present disclosure, a request bit and an acknowledgment bit are set, and a process of protocol interaction is implemented using extra bits. In this case, a transmit end and a receive end need to transmit only one map that represents configuration of a physical connection group. In comparison with the other approaches, transmission efficiency is improved.

Figure 22:
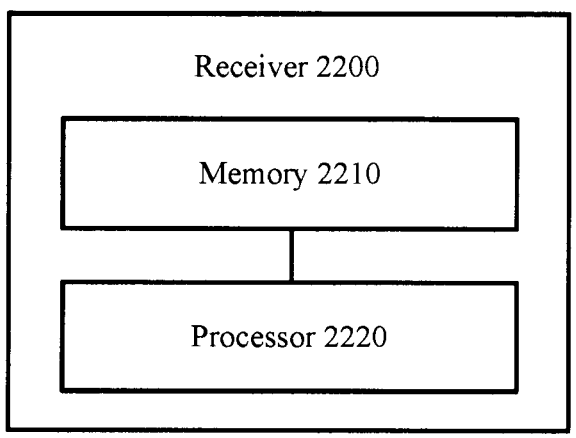
FIG. 22 is a schematic block diagram of a receiver according to another embodiment of the present disclosure.

FIG. 22 is a schematic block diagram of a receiver 2200 according to another embodiment of the present disclosure. The receiver 2200 in FIG. 22 includes a memory 2210 configured to store a program, and a processor 2220 configured to execute the program, where when the program is executed, the processor 2220 is configured to receive N sub-streams using N physical connections in a physical connection group, where a sub-stream transmitted over each physical connection includes configuration status information of each physical connection, the configuration status information includes an identifier of each physical connection and map information in the physical connection group, and the map information includes M bits, where M is a total quantity of physical connections that can be contained in the physical connection group, values of bits that are corresponding to identifiers of the N physical connections and that are in the M bits are 1, and values of the remaining bits are 0, and the configuration status information further includes a request bit and an acknowledgment bit, the request bit is used to request a receive end to update configuration of the physical connection group according to the map information, and the acknowledgment bit is used by a receive end to confirm a configuration update of the physical connection group, and assemble the N sub-streams according to a sequence of the N physical connections in the physical connection group in order to restore the data stream.

In this embodiment of the present disclosure, a request bit and an acknowledgment bit are set, and a process of protocol interaction is implemented using extra bits. In this case, a transmit end and a receive end need to transmit only one map that represents configuration of a physical connection group. In comparison with the other approaches, transmission efficiency is improved.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the multiple embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, function units in the embodiments of the present disclosure may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of the present disclosure essentially, or the part contributing to the other approaches, or some of the technical solutions may be implemented in a form of a software product. The software product is stored in a storage medium, and includes multiple instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for transmitting a data stream in a flexible Ethernet, the method comprising:
    obtaining, by a transmit end, a to-be-transmitted data stream, wherein the to-be-transmitted data stream is to be transmitted using a physical connection group between the transmit end and a receive end, and wherein the physical connection group comprises N physical connections;
    allocating, by the transmit end, the to-be-transmitted data stream to the N physical connections according to a sequence of the N physical connections in the physical connection group to obtain N Rib-streams respectively corresponding to the N physical connections; and
    transmitting, by the transmit end, the N sub-streams using the N physical connections, wherein a sub-stream transmitted over each physical connection comprises configuration status information of each physical connection, wherein the configuration status information comprises an identifier of each physical connection and an identifier of a physical connection adjacent to each physical connection in the physical connection group, wherein configuration status information of the N physical connections jointly indicates the sequence of the N physical connections, and wherein the physical connection adjacent to each physical connection in the physical connection group comprises a previous physical connection of each physical connection in the physical connection group or a next physical connection of each physical connection in the physical connection group.

2. The method of claim 1, wherein the configuration status information of each physical connection is comprised in an overhead code block of the sub-stream transmitted over each physical connection.

3. The method of claim 1, wherein the configuration status information of each physical connection further comprises first indication information or second indication information, wherein the first indication information indicates that a current physical connection comprises a first physical connection in the physical connection group, and wherein the second indication information indicates that the current physical connection comprises a last physical connection in the physical connection group.

4. The method of claim 1, wherein the sub-stream transmitted over each physical connection further comprises third indication information, and wherein the method further comprises negotiating, using the third indication information, with the receive end to update the physical connection group when a quantity of physical connections in the physical connection group or the sequence of the N physical connections in the physical connection group changes.

5. The method of claim 1, wherein the sub-stream transmitted over each physical connection further comprises an identifier of the physical connection group.

6. The method of claim 1, wherein the configuration status information of each physical connection is periodically transmitted in basic frames.

7. A transmitter, comprising:
    a memory comprising a program code; and
    a processor coupled to the memory, wherein the program code causes the processor to be configured to:
        obtain a to-be-transmitted data stream, wherein the to-be-transmitted data stream is to be transmitted using a physical connection group between a transmit end and a receive end, and wherein the physical connection group comprises N physical connections;
        allocate the to-be-transmitted data stream to the N physical connections according to a sequence of the N physical connections in the physical connection group to obtain N sub-streams respectively corresponding to the N physical connections; and
        transmit the N sub-streams using the N physical connections, wherein a sub-stream transmitted over each physical connection comprises configuration status information of each physical connection, wherein the configuration status information comprises an identifier of each physical connection and an identifier of a physical connection adjacent to each physical connection in the physical connection group, wherein configuration status information of the N physical connections jointly indicates the sequence of the N physical connections, and wherein the physical connection adjacent to each physical connection in the physical connection group comprises a previous physical connection of each physical connection in the physical connection group or a next physical connection of each physical connection in the physical connection group.

8. The transmitter of claim 7, wherein the configuration status information of each physical connection is comprised in an overhead code block of the sub-stream transmitted over each physical connection.

9. The transmitter of claim 7, wherein the configuration status information of each physical connection further comprises first indication information or second indication information, wherein the first indication information indicates that a current physical connection comprises a first physical connection in the physical connection group, and wherein the second indication information indicates that the current physical connection comprises a last physical connection in the physical connection group.

10. The transmitter of a claim 7, wherein the sub-stream transmitted over each physical connection further comprises third indication information, and wherein the program code further causes the processor to be configured to negotiate, using the third indication information, with the receive end to update the physical connection group when a quantity of physical connections in the physical connection group or the sequence of the physical connections in the physical connection group changes.

11. A receiver, comprising:
a memory comprising a program code; and
a processor coupled to the memory, wherein the program code causes the processor to be configured to:
receive N sub-streams using N physical connections in a physical connection group, wherein a scab-stream transmitted over each physical connection comprises configuration status information of each physical connection, wherein the configuration status information comprises an identifier of each physical connection and an identifier of a physical connection adjacent to each physical connection in the physical connection group, wherein configuration status information of the N physical connections jointly indicates a sequence of the N physical connections, and wherein the physical connection adjacent to each physical connection in the physical connection group comprises a previous physical connection of each physical connection in the physical connection group or a next physical connection of each physical connection in the physical connection group; and
assemble the N sub-streams according to the sequence of the N physical connections in order to restore a data stream.

12. The receiver of claim 11, wherein the program code further causes the processor to be configured to:
determine, according to identifiers of the N physical connections, the N physical connections comprised in the physical connection group; and
determine the sequence of the N physical connections according to identifiers of adjacent physical connections of the N physical connections.

13. The receiver of claim 11, wherein the configuration status information of each physical connection is comprised in an overhead code block of the sub-stream transmitted over each physical connection.

14. The receiver of claim 11, wherein the configuration status information of each physical connection further comprises first indication information or second indication information, wherein the first indication information indicates that a current physical connection comprises a first physical connection in the physical connection group, and wherein the second indication information indicates that the current physical connection comprises a last physical connection in the physical connection group.

15. The receiver of claim 11, wherein the sub-stream transmitted over each physical connection further comprises third indication information, and wherein the program code further causes the processor to be configured to negotiate, using the third indication information, with a transmit end to update the physical connection group when a quantity of physical connections in the physical connection group or the sequence of the N physical connections in the physical connection group changes.

16. The receiver of claim 11, wherein the sub-stream transmitted over each physical connection further comprises an identifier of the physical connection group.

17. The receiver of claim 11, wherein the configuration status information of each physical connection is periodically transmitted in basic frames.

* * * * *

UNITED STATES PATENT AND TRADEMARK OFFICE
CERTIFICATE OF CORRECTION

PATENT NO. : 10,425,357 B2  
APPLICATION NO. : 15/857083  
DATED : September 24, 2019  
INVENTOR(S) : Qiwen Zhong and Qiuyou Wu Page 1 of 1

It is certified that error appears in the above-identified patent and that said Letters Patent is hereby corrected as shown below:

In the Claims

Claim 1, Column 29, Line 49: "N Rib-streams" should read "N sub-streams"

Claim 11, Column 31, Line 19: "a scab-stream" should read "a sub-stream"

Signed and Sealed this  
Nineteenth Day of November, 2019

Andrei Iancu  
*Director of the United States Patent and Trademark Office*